United States Patent
Rabinovich et al.

(10) Patent No.: US 10,977,554 B2
(45) Date of Patent: Apr. 13, 2021

(54) FULLY CONVOLUTIONAL INTEREST POINT DETECTION AND DESCRIPTION VIA HOMOGRAPHIC ADAPTATION

(71) Applicant: Magic Leap, Inc., Plantation, FL (US)

(72) Inventors: Andrew Rabinovich, San Francisco, CA (US); Daniel DeTone, San Francisco, CA (US); Tomasz Jan Malisiewicz, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 100 days.

(21) Appl. No.: 16/190,948

(22) Filed: Nov. 14, 2018

(65) Prior Publication Data

US 2019/0147341 A1 May 16, 2019

Related U.S. Application Data

(60) Provisional application No. 62/608,248, filed on Dec. 20, 2017, provisional application No. 62/586,149, filed on Nov. 14, 2017.

(51) Int. Cl.
*G06K 9/00* (2006.01)
*G06N 3/08* (2006.01)
(Continued)

(52) U.S. Cl.
CPC ......... *G06N 3/082* (2013.01); *G06K 9/00664* (2013.01); *G06K 9/4628* (2013.01);
(Continued)

(58) Field of Classification Search
None
See application file for complete search history.

(56) References Cited

U.S. PATENT DOCUMENTS

2015/0110348 A1* 4/2015 Solanki .............. G06K 9/00597
382/103
2016/0012317 A1 1/2016 Mayle et al.
(Continued)

OTHER PUBLICATIONS

Convolutional Neural Network Architecture for Geometric Matching. Rocco et al. Apr. 2017.*
(Continued)

*Primary Examiner* — Delomia L Gilliard
(74) *Attorney, Agent, or Firm* — Kilpatrick Townsend & Stockton LLP

(57) ABSTRACT

Systems, devices, and methods for training a neural network and performing image interest point detection and description using the neural network. The neural network may include an interest point detector subnetwork and a descriptor subnetwork. An optical device may include at least one camera for capturing a first image and a second image. A first set of interest points and a first descriptor may be calculated using the neural network based on the first image, and a second set of interest points and a second descriptor may be calculated using the neural network based on the second image. A homography between the first image and the second image may be determined based on the first and second sets of interest points and the first and second descriptors. The optical device may adjust virtual image light being projected onto an eyepiece based on the homography.

14 Claims, 15 Drawing Sheets

(51) Int. Cl.
*G06N 3/04* (2006.01)
*G06T 7/00* (2017.01)
*G06K 9/46* (2006.01)
*G06K 9/62* (2006.01)

(52) U.S. Cl.
CPC ......... *G06K 9/4671* (2013.01); *G06K 9/6274* (2013.01); *G06N 3/0454* (2013.01); *G06N 3/0481* (2013.01); *G06T 7/97* (2017.01)

(56) References Cited

U.S. PATENT DOCUMENTS

2016/0300121 A1* 10/2016 Chertok .................. G06N 3/04
2018/0268256 A1* 9/2018 Di Febbo ............. G06K 9/6211
2018/0315193 A1* 11/2018 Paschalakis ........... A61B 3/145

OTHER PUBLICATIONS

PCT/US2018/061048, "International Search Report and Written Opinion", dated Mar. 8, 2019, 10 pages.
Rocco, et al., "Convolutional Neural Network Architecture for Geometric Matching", IEEE Conference on Computer Vision and Pattern Recognition, Apr. 13, 2017, 15 pages.
PCT/US2018/061048, "Invitation to Pay Add'l Fees and Partial Search Report", dated Jan. 17, 2019, 2 pages.
Altwaijry, et al., "Learning to Detect and Match Keypoints with Deep Architectures", Available Online at: URL: https://vision.cornell.edu/se3/wp-content/uploads/2016/08/learningdetect-match.pdf, Aug. 1, 2016, pp. 1-12.
Altwaijry, et al., "Learning to Match Aerial Images with Deep Attentive Architectures", IEEE Conference on Computer Vision and Pattern Recognition, Jun. 27, 2016, pp. 3539-3547.
Detone, et al., "Deep Image Homography Estimation", Available online at https://arxiv.orgiabs/1606.03798, Jun. 13, 2016, pp. 1-6.
Detone, et al., "Toward Geometric Deep Slam", Available Online at: https://arxiv.org/pdf/1707.07410.pdf, Jul. 24, 2017, pp. 1-14.
EP18878061.3, "Extended European Search Report", dated Nov. 23, 2020, 9 pages.
Jahrer, et al., "Learned Local Descriptors for Recognition and Matching", Computer Vision Winter Workshop, Feb. 4-6, 2008, pp. 1-7.
Nguyen, et al., "Unsupervised Deep Nomography: A Fast and Robust Homography Estimation Model", Cornell University Library, Sep. 12, 2017, pp. 1-8.
Zheng, et al., "Sift Meets CNN: A Decade Survey of Instance Retrieval", Journal of Latex Class Files, vol. 14, No. 5, Aug. 8, 2015, pp. 1-21.

* cited by examiner

UNLABELED DATASET
136

FULLY CONVOLUTIONAL INTEREST POINT DETECTION AND DESCRIPTION VIA HOMOGRAPHIC ADAPTATION

CROSS-REFERENCES TO RELATED APPLICATIONS

This application claims priority to U.S. Provisional Patent Application No. 62/586,149 filed Nov. 14, 2017 titled "FULLY CONVOLUTIONAL INTEREST POINT DETECTION AND DESCRIPTION VIA HOMOGRAPHIC ADAPTATION," and to U.S. Provisional Patent Application No. 62/608,248 filed Dec. 20, 2017 titled "FULLY CONVOLUTIONAL INTEREST POINT DETECTION AND DESCRIPTION VIA HOMOGRAPHIC ADAPTATION," the entire disclosures of which are hereby incorporated by reference, for all purposes, as if fully set forth herein.

BACKGROUND OF THE INVENTION

Interest point detection is an important concept in computer vision. The first step in many geometric computer vision tasks such as pose estimation, simultaneous localization and mapping (SLAM), structure-from-motion, sparse three-dimensional (3D) mapping, camera calibration, and image matching is to extract interest points from images. Interest points are two-dimensional (2D) locations in an image which are stable and repeatable from different lighting conditions and view-points. The entire subfield of mathematics and computer vision, known as multiple view geometry, consists of theorems and algorithms built on the assumption that points can be reliably extracted and matched across images. However, the input to most real-world computer vision systems is not idealized point locations but is instead raw, unlabeled images. Several approaches have been developed to detect the interest points in such images, with only limited success.

Despite the progress made in these areas, there is a need in the art for improved methods, systems, and devices related to image interest point detection.

SUMMARY OF THE INVENTION

The present disclosure relates generally to the computer vision task of interest point detection and matching. More particularly, embodiments of the present disclosure provide systems, devices, and methods for image interest point detection and description using a neural network. Although portions of the present disclosure are described in reference to an augmented reality (AR) device, the disclosure is applicable to a variety of applications in computer vision and image display systems.

In accordance with a first aspect of the present invention, a method of training a neural network for image interest point detection and description is provided. The method may include generating a reference dataset comprising a plurality of reference sets, wherein each of the plurality of reference sets includes an image and a set of reference interest points corresponding to the image. The method may also include, for each reference set of the plurality of reference sets: generating a warped image by applying a homography to the image, generating a warped set of reference interest points by applying the homography to the set of reference interest points, calculating, by the neural network receiving the image as input, a set of calculated interest points and a calculated descriptor, calculating, by the neural network receiving the warped image as input, a set of calculated warped interest points and a calculated warped descriptor, calculating a loss based on the set of calculated interest points, the calculated descriptor, the set of calculated warped interest points, the calculated warped descriptor, the set of reference interest points, the warped set of reference interest points, and the homography, and modifying the neural network based on the loss.

In some embodiments, the neural network includes an interest point detector subnetwork and a descriptor subnetwork. In some embodiments, the interest point detector subnetwork is configured to receive the image as input and calculate the set of calculated interest points based on the image. In some embodiments, the descriptor subnetwork is configured to receive the image as input and calculate the calculated descriptor based on the image. In some embodiments, modifying the neural network based on the loss includes modifying one or both of the interest point detector subnetwork and the descriptor subnetwork based on the loss. In some embodiments, the method includes prior to generating the reference dataset, training the interest point detector subnetwork using a synthetic dataset including a plurality of synthetic images and a plurality of sets of synthetic interest points. In some embodiments, generating the reference dataset includes generating the reference dataset using the interest point detector subnetwork.

In some embodiments, generating the reference dataset includes for each reference set of the plurality of reference sets, obtaining the image from an unlabeled dataset comprising a plurality of unlabeled images, generating a plurality of warped images by applying a plurality of homographies to the image, calculating, by the neural network receiving the plurality of warped images as input, a plurality of sets of calculated warped interest points, generating a plurality of sets of calculated interest points by applying a plurality of inverse homographies to the plurality of sets of calculated warped interest points, and aggregating the plurality of sets of calculated interest points to obtain the set of reference interest points. In some embodiments, each of the plurality of reference sets further includes a reference descriptor corresponding to the image. In some embodiments, generating the reference dataset includes for each reference set of the plurality of reference sets, obtaining the image from an unlabeled dataset comprising a plurality of unlabeled images, generating a plurality of warped images by applying a plurality of homographies to the image, calculating, by the neural network receiving the plurality of warped images as input, a plurality of calculated warped descriptors, generating a plurality of calculated descriptors by applying a plurality of inverse homographies to the plurality of calculated warped descriptors, and aggregating the plurality of calculated descriptors to obtain the reference descriptor. In some embodiments, the set of reference interest points is a two-dimensional map having values corresponding to a probability that a particular pixel of the image has an interest point is located at the particular pixel.

In accordance with a second aspect of the present invention, a method of performing image interest point detection and description using a neural network is provided. The method may include capturing a first image. The method may also include capturing a second image. The method may further include calculating, by the neural network receiving the first image as input, a first set of calculated interest points and a first calculated descriptor. The method may further include calculating, by the neural network receiving the second image as input, a second set of calculated interest points and a second calculated descriptor. The method may further include determining a homography between the first image and the second image based on the first and second sets of calculated interest points and the first and second calculated descriptors. In some embodiments, the neural network includes an interest point detector subnetwork configured to calculate the first set of calculated interest points and the second set of calculated interest points and a descriptor subnetwork configured to calculate the first calculated descriptor and the second calculated descriptor.

In some embodiments, the interest point detector subnetwork is configured to calculate the first set of calculated interest points concurrently with the descriptor subnetwork calculating the first calculated descriptor. In some embodiments, the interest point detector subnetwork is configured to calculate the second set of calculated interest points concurrently with the descriptor subnetwork calculating the second calculated descriptor. In some embodiments, the method further includes training the neural network by generating a reference dataset comprising a plurality of reference sets. In some embodiments, each of the plurality of reference sets includes an image and a set of reference interest points corresponding to the image. Training the neural network may further include for each reference set of the plurality of reference sets, generating a warped image by applying a homography to the image, generating a warped set of reference interest points by applying the homography to the set of reference interest points, calculating, by the neural network receiving the image as input, a set of calculated interest points and a calculated descriptor, calculating, by the neural network receiving the warped image as input, a set of calculated warped interest points and a calculated warped descriptor, calculating a loss based on the set of calculated interest points, the calculated descriptor, the set of calculated warped interest points, the calculated warped descriptor, the set of reference interest points, the warped set of reference interest points, and the homography, and modifying the neural network based on the loss.

In some embodiments, modifying the neural network based on the loss includes modifying one or both of the interest point detector subnetwork and the descriptor subnetwork based on the loss. In some embodiments, the method further includes prior to generating the reference dataset, training the interest point detector subnetwork using a synthetic dataset including a plurality of synthetic images and a plurality of sets of synthetic interest points. In some embodiments, generating the reference dataset includes generating the reference dataset using the interest point detector subnetwork. In some embodiments, generating the reference dataset includes for each reference set of the plurality of reference sets, obtaining the image from an unlabeled dataset comprising a plurality of unlabeled images, generating a plurality of warped images by applying a plurality of homographies to the image, calculating, by the neural network receiving the plurality of warped images as input, a plurality of sets of calculated warped interest points, generating a plurality of sets of calculated interest points by applying a plurality of inverse homographies to the plurality of sets of calculated warped interest points, and aggregating the plurality of sets of calculated interest points to obtain the set of reference interest points. In some embodiments, each of the plurality of reference sets further includes a reference descriptor corresponding to the image. In some embodiments, wherein generating the reference dataset includes for each reference set of the plurality of reference sets, obtaining the image from an unlabeled dataset comprising a plurality of unlabeled images, generating a plurality of warped images by applying a plurality of homographies to the image, calculating, by the neural network receiving the plurality of warped images as input, a plurality of calculated warped descriptors, generating a plurality of calculated descriptors by applying a plurality of inverse homographies to the plurality of calculated warped descriptors, and aggregating the plurality of calculated descriptors to obtain the reference descriptor.

In accordance with a third aspect of the present invention, an optical device (i.e., an optical system) is provided. The optical device may include at least one camera configured to capture a first image and a second image. The optical device may also include one or more processors coupled to the camera and configured to perform operations. The operations may include receiving the first image and the second image from the at least one camera. The operations may also include calculating, by a neural network using the first image as an input, a first set of calculated interest points and a first calculated descriptor. The operations may further include calculating, by the neural network using the second image as an input, a second set of calculated interest points and a second calculated descriptor. The operations may further include determining a homography between the first image and the second image based on the first and second sets of calculated interest points and the first and second calculated descriptors. In some embodiments, the neural network includes an interest point detector subnetwork configured to calculate the first set of calculated interest points and the second set of calculated interest points and a descriptor subnetwork configured to calculate the first calculated descriptor and the second calculated descriptor.

In some embodiments, the interest point detector subnetwork is configured to calculate the first set of calculated interest points concurrently with the descriptor subnetwork calculating the first calculated descriptor. In some embodiments, the interest point detector subnetwork is configured to calculate the second set of calculated interest points concurrently with the descriptor subnetwork calculating the second calculated descriptor. In some embodiments, the neural network was previously trained by generating a reference dataset comprising a plurality of reference sets, wherein each of the plurality of reference sets includes an image and a set of reference interest points corresponding to the image. In some embodiments, the neural network was previously trained by for each reference set of the plurality of reference sets, generating a warped image by applying a homography to the image, generating a warped set of reference interest points by applying the homography to the set of reference interest points, calculating, by the neural network receiving the image as input, a set of calculated interest points and a calculated descriptor, calculating, by the neural network receiving the warped image as input, a set of calculated warped interest points and a calculated warped descriptor, calculating a loss based on the set of calculated interest points, the calculated descriptor, the set of calculated warped interest points, the calculated warped descriptor, the set of reference interest points, the warped set of reference interest points, and the homography, and modifying the neural network based on the loss.

In some embodiments, modifying the neural network based on the loss includes modifying one or both of the interest point detector subnetwork and the descriptor subnetwork based on the loss. In some embodiments, generating the reference dataset includes for each reference set of the plurality of reference sets, obtaining the image from an unlabeled dataset comprising a plurality of unlabeled images, generating a plurality of warped images by applying a plurality of homographies to the image, calculating, by the neural network receiving the plurality of warped images as input, a plurality of sets of calculated warped interest points, generating a plurality of sets of calculated interest points by applying a plurality of inverse homographies to the plurality of sets of calculated warped interest points, and aggregating the plurality of sets of calculated interest points to obtain the set of reference interest points. In some embodiments, each of the plurality of reference sets further includes a reference descriptor corresponding to the image. In some embodiments, generating the reference dataset includes, for each reference set of the plurality of reference sets, obtaining the image from an unlabeled dataset comprising a plurality of unlabeled images, generating a plurality of warped images by applying a plurality of homographies to the image, calculating, by the neural network receiving the plurality of warped images as input, a plurality of calculated warped descriptors, generating a plurality of calculated descriptors by applying a plurality of inverse homographies to the plurality of calculated warped descriptors, and aggregating the plurality of calculated descriptors to obtain the reference descriptor.

Numerous benefits are achieved by way of the present invention over conventional techniques. For example, some embodiments of the present invention provide a self-supervised framework for training interest point detectors and descriptors that operates on any set of single or multi-channel two-dimensional (2D) images (e.g., internet RGB photos, tiny robotics grayscale cameras, underwater images, aerial images, telescope imagery, depth sensor images, thermal camera images, etc.). Such embodiments are suitable for a large number of multiple-view geometry problems. Embodiments provide fully-convolutional models operating on full sized images that jointly compute pixel-level interest point locations and associated descriptors in one forward pass. Some embodiments may be described as homographic adaptation: a multi-scale, multi-homography approach for boosting interest point detection accuracy and performing cross-domain adaptation (for example, synthetic to real). Embodiments of the invention, as proven with training runs on the MS-COCO generic image dataset, detect richer interest points than traditional corner detectors or pre-adapted deep models. Such embodiments enable interest point repeatability on the HPatches dataset and outperform other traditional descriptors such as ORB and SIFT on point matching accuracy and on the task of homography estimation. Furthermore, embodiments of the invention do not require explicit geometric correspondence information. Other benefits of the present invention will be readily apparent to those skilled in the art.

DETAILED DESCRIPTION OF SPECIFIC EMBODIMENTS

Figure 1:
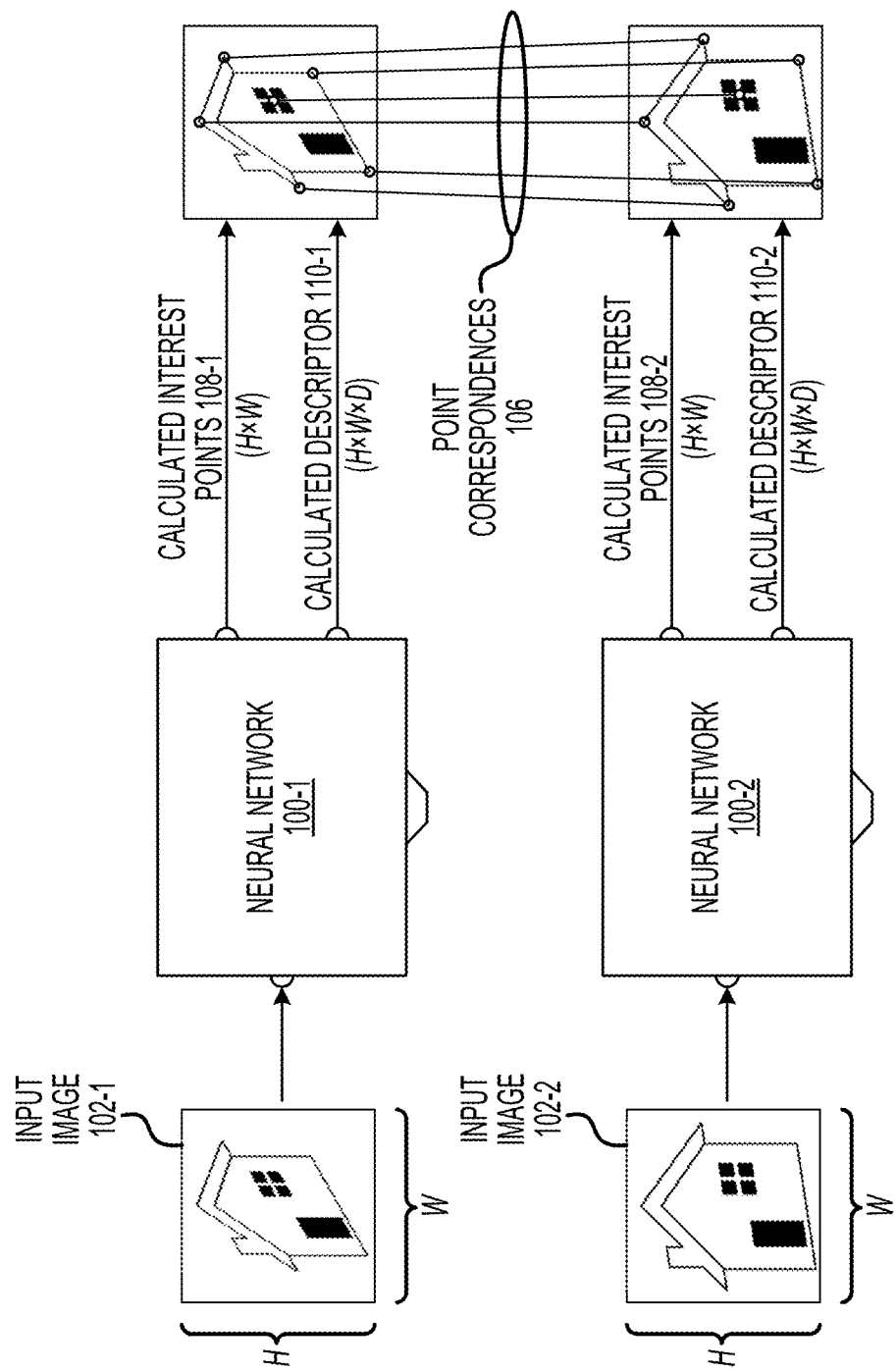
FIG. 1 illustrates a determination of point correspondences between interest points of a pair of input images using a neural network, according to some embodiments of the present invention.

Convolutional neural networks have been shown to be superior to hand-engineered representations on almost all tasks requiring images as input. In particular, fully convolutional neural networks which predict two-dimensional (2D) "key-points" or "landmarks" are well studied for a variety of tasks such as human pose estimation, object detection, and room layout estimation. Some of these techniques utilize a large dataset of 2D ground truth locations labeled with human annotations. It seems natural to similarly formulate interest point detection as a large-scale supervised machine learning problem and train the latest convolutional neural network architecture to detect them. Unfortunately, when compared to more semantic tasks such as human-body key-point estimation, where a network is trained to detect semantic body parts such as the corner of the mouth or left ankle, the notion of interest point detection is semantically ill-defined. This difficulty makes training convolution neural networks with strong supervision of interest points non-trivial.

Instead of using human supervision to define interest points in real images, embodiments of the present invention offer a self-supervised solution using self-training. In the approaches of the embodiments described herein, a large dataset of pseudo-ground truth interest point locations in real images is created, supervised by the interest point detector itself rather than human knowledge. To generate the pseudo-ground truth interest points, a fully convolutional neural network is first trained on millions of unique examples from a synthetic image dataset. As feature extraction is a basic step for image matching and tracking in image sequences, it was acknowledged that detection and precise location of distinct points may be important. These distinct points were characterized as corners, edges (basic elements for the analysis of poly-hedra), and centers of circular features, such as holes, disk, or rings. Junctions (Y, X, T, L) were also deemed critical for detecting such distinct points. For example, T-junctions generically indicate interposition and hence depth discontinuities.

Borrowing from these insights, a large dataset of synthetic shapes for large-scale training of the interest point detector may be created consisting of simple geometric shapes where there is no ambiguity in the interest point locations. The interest point detector as described herein was shown to significantly outperform traditional interest point detectors on the dataset of synthetic shapes. When applied to real images, the interest point detector performs well considering that domain adaptation is a known problem when training on synthetic images. However, when compared to classical interest point detectors on a diverse set of image textures and patterns, the performance of the interest point detector is not so consistent. To bridge the gap in performance on real world images between the interest point detector and classical detectors, embodiments of the present invention (alternatively referred to herein as homographic adaptation) permit multi-scale, multitransforms.

Homographic adaptation enables self-supervised training of interest point detectors. In some embodiments, it warps the input image multiple times to help an interest point detector see the scene from many different viewpoints and scales. When used in conjunction with the interest point detector to generate the pseudo-ground truth interest points and boost the performance of the detector, the resulting detections are more repeatable. One step after detecting robust and repeatable interest points is to attach a fixed dimensional descriptor vector to each point (or to all image pixels), which can be used for matching interest points across images. Therefore, in some embodiments of the present invention, the interest point detector subnetwork may be combined with a descriptor subnetwork. The resulting network can be used to extracts points from a pair of images and establish point correspondences, as shown in FIG. 1.

According to embodiments of the invention, which includes a self-supervised approach, an initial interest point detector and a homographic adaptation procedure automatically labels images from a target, unlabeled domain. The generated labels are in turn used to train a fully convolutional network that jointly extracts points and descriptors from an image. The fully convolutional network can be used in a wide range of applications, particularly those involving image-to-image geometry tasks such as computing a homography between two images. Homographies give exact, or almost exact, image-to-image transformations for camera motion with only rotation around the camera center, scenes with large distances to objects, and planar scenes. Because most of the world is reasonably planar, a homography is good model for what happens when the same three-dimensional (3D) point is seen from different viewpoints. Because homographies do not require 3D information, they can be randomly sampled and easily applied to any 2D image involving little more than bilinear interpolation. For these reasons, homographies are utilized in some embodiments of the present invention.

FIG. 1 illustrates the determination of point correspondences 106 between the interest points of a pair of input images 102 using a neural network 100, according to some embodiments of the present invention. Specifically, FIG. 1 shows two instantiations of neural network 100 (i.e., neural networks 100-1, 100-2) that is a fully convolutional neural network that computes scale invariant feature transform (SIFT)-like 2D interest point locations and descriptors in a single forward pass utilizing point correspondence. When receiving input images 102-1, 102-2 as input, neural networks 100-1, 100-2 calculate sets of calculated interest points 108-1, 108-2 and calculated descriptors 110-1, 110-2 based on input images 102-1, 102-2, respectively. Point correspondences 106 are then determined by a comparison between calculated interest points 108-1, 108-2, which is informed by the descriptors associated with each of the interest points. For example, descriptors associated with different interest points may be matched. The interest points corresponding to different images having the most similar descriptors may be determined to correspond to each other, according to one of several possible similarity scoring procedures.

According to one example, a first interest point corresponding to input image 102-1 may be determined to correspond to a second interest point corresponding to input image 102-2 by determining that, amongst the five closest interest points (according to pixel-to-pixel distance) to the first interest point, the descriptor associated with the second interest point is most similar (determined by, for example, using the L2 distance) to the descriptor associated with the first interest point, as compared to the descriptors associated with the five closest interest points. According to another example, a first interest point corresponding to input image 102-1 may be determined to correspond to a second interest point corresponding to input image 102-2 by determining that, amongst all interest points corresponding to input image 102-2, the descriptor associated with the second interest point is most similar to the descriptor associated with the first interest point, as compared to the descriptors associated with all interest points corresponding to input image 102-2.

Figure 2:
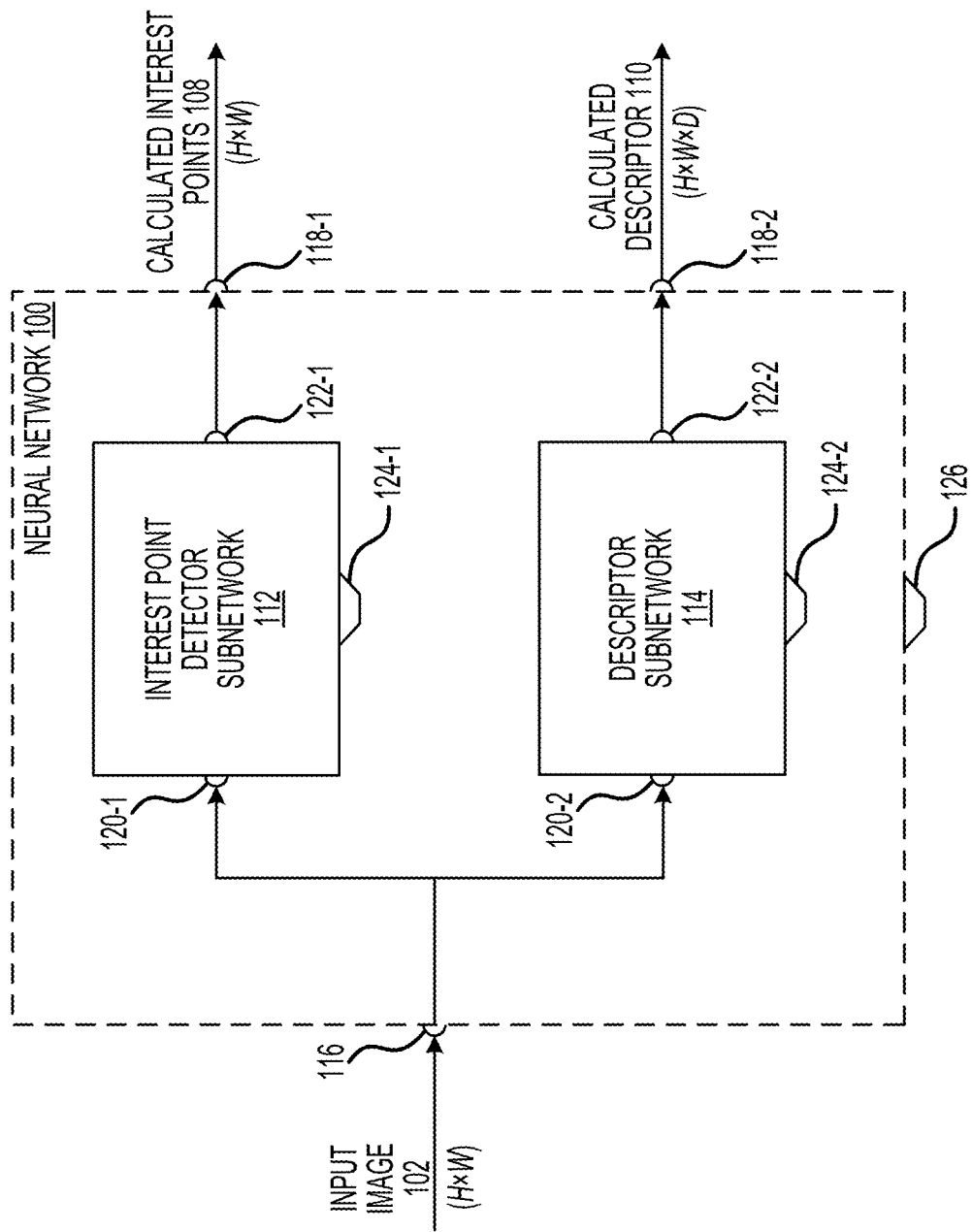
FIG. 2 illustrates a general architecture of a neural network, according to some embodiments of the present invention.

FIG. 2 illustrates a general architecture of neural network 100, according to some embodiments of the present invention. Neural network 100 may include an interest point detector subnetwork 112 and a descriptor subnetwork 114, each of the two subnetworks having a single subnetwork input 120-1, 120-2 (respectively) and a single subnetwork output 122-1, 122-2 (respectively). Although the two subnetworks are illustrated separately, they may share one or more convolutional layers and/or neurons as described in reference to FIG. 9. In some embodiments, neural network 100 may include a network input 116 configured to receive input image 102 as input. Input image 102 may then be fed to subnetwork inputs 120-1, 120-2. Upon receiving input image 102 at subnetwork input 120-1, interest point detector subnetwork 112 may calculate and output calculated interest points 108 at subnetwork output 122-1, which is then fed into network output 118-1. Upon receiving input image 102 at subnetwork input 120-2, descriptor subnetwork 114 may calculate and output calculated descriptor 110 at subnetwork output 122-2, which is then fed into network output 118-2. Accordingly, subnetworks 112, 114 can provide different outputs based on the same input, and represent different branches of neural network 100.

Neural network 100 may operate on a full-sized image and may produce interest point detections accompanied by fixed length descriptors in a single forward pass. In some embodiments, input image 102 may have a dimensionality of H×W where H is the height of input image 102 in pixels and W is the width of input image 102 in pixels. In the same embodiments, calculated interest points 108 may be a list of interest point pixel locations (e.g., a list of coordinate pairs) or, additionally or alternatively, calculated interest points 108 may be a 2D map having a dimensionality of H×W where each pixel corresponds to a probability "point" for that pixel in the input (i.e., input image 102). In the same embodiments, calculated descriptor 110 may be a set of fixed length descriptors, each of which corresponds to an identified interest point or, additionally or alternatively, calculated descriptor 110 may have a dimensionality of H×W×D where D is the length of the descriptors calculated at each pixel of the H×W image. Accordingly, even pixels having a low probability of containing an interest point have a descriptor of length D.

Training of neural network 100 may be enabled by network modifier 126 and/or subnetwork modifiers 124-1, 124-2, which may receive an error signal, a loss signal, and/or a correction signal during a training phase causing layers and/or neurons of the networks to be modified. Neural network 100 may be modified such that an error between the network outputs (calculated interest points 108 and calculated descriptor 110) and ground truth data may be reduced during subsequent runs with the same input image 102 or different images. For example, neural network 100 may be modified based on an error signal/value that indicates a difference between an output and ground truth, based on a loss signal/value that indicates some quantity that is to be minimized, and/or based on a correction signal that indicates a specific modification to be made to neural network 100. Modifying neural network 100 may include modifying only interest point detector subnetwork 112, modifying only descriptor subnetwork 114, and/or modifying both of subnetworks 112, 114.

Figure 3:
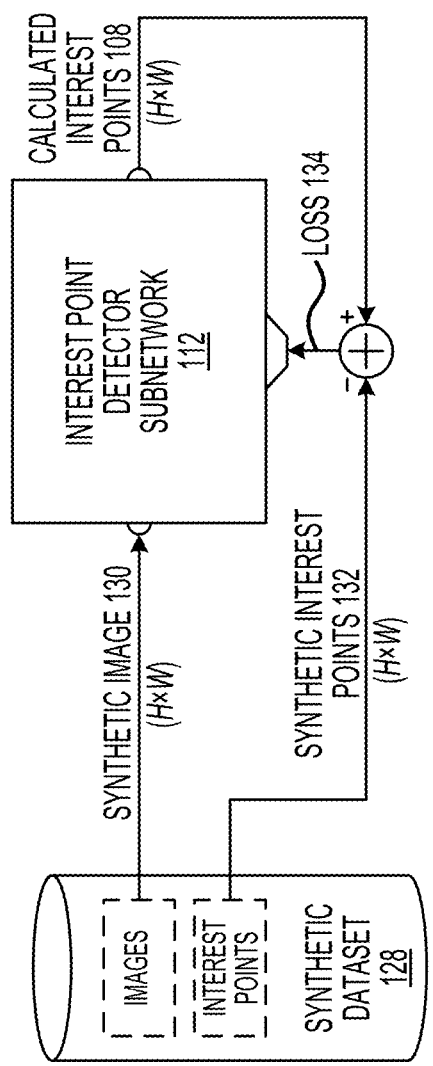
FIG. 3 illustrates a first training step according to the present invention in which an interest point detector subnetwork is trained using a synthetic dataset comprising a plurality of synthetic images.

FIG. 3 illustrates a first training step according to the present invention in which interest point detector subnetwork 112 is trained using a synthetic dataset 128 comprising a plurality of synthetic images. The training step illustrated in FIG. 3 may only include interest point detector subnetwork 112 and may ignore descriptor subnetwork 114. Because there is no pre-existing large database of interest point labeled images, a deep interest point detector benefits from the creation of a large-scale synthetic dataset that consists of simplified 2D geometry via synthetic data rendering of quadrilaterals, triangles, lines and ellipses. Examples of these shapes are shown in reference to FIG. 7. In this dataset, label ambiguity can be removed by modeling interest points with simple Y-junctions, L-junctions, T-junctions as well as centers of tiny ellipses and end points of line segments.

Once the synthetic images are rendered, homographic warps are applied to each image to augment the number of training examples. The data may be generated in real time and no example may be seen by the network twice. During a single training iteration, a synthetic image 130 is provided to interest point detector subnetwork 112, which calculates a set of calculated interest points 108. A set of synthetic interest points 132 corresponding to synthetic image 130 are compared to calculated interest points 108 and a loss 134 is calculated based on the comparison. Interest point detector subnetwork 112 is then modified based on loss 134. Multiple training iterations are performed until one or more conditions are met, such as loss 134 dropping below a predetermined threshold and/or synthetic dataset 128 being exhaustively used.

Compared to other traditional corner detection approaches such as FAST, Harris corners, and Shi-Tomasi's "Good Features To Track", interest point detector subnetwork 112 produces superior results on synthetic dataset 128. Further evaluation of interest point detector subnetwork consisted of using simple synthetic geometry that a human could easily label with the ground truth corner locations. In one performance evaluation, two different models of interest point detector subnetwork 112 were used. Both models shared the same encoder architecture but differed in the number of neurons per layer, the first model having 64-64-64-64-128-128-128-128-128 neurons per layer and the second model having 9-9-16-16-32-32-32-32-32 neurons per layer. Each detector was given an evaluation dataset with synthetic dataset 128 to determine how well they localized simple corners. An evaluation demonstrated that interest point detector subnetwork 112 outperformed the classical detectors in all categories, with the classical detectors having difficulty with random inputs in particular.

Figure 4:
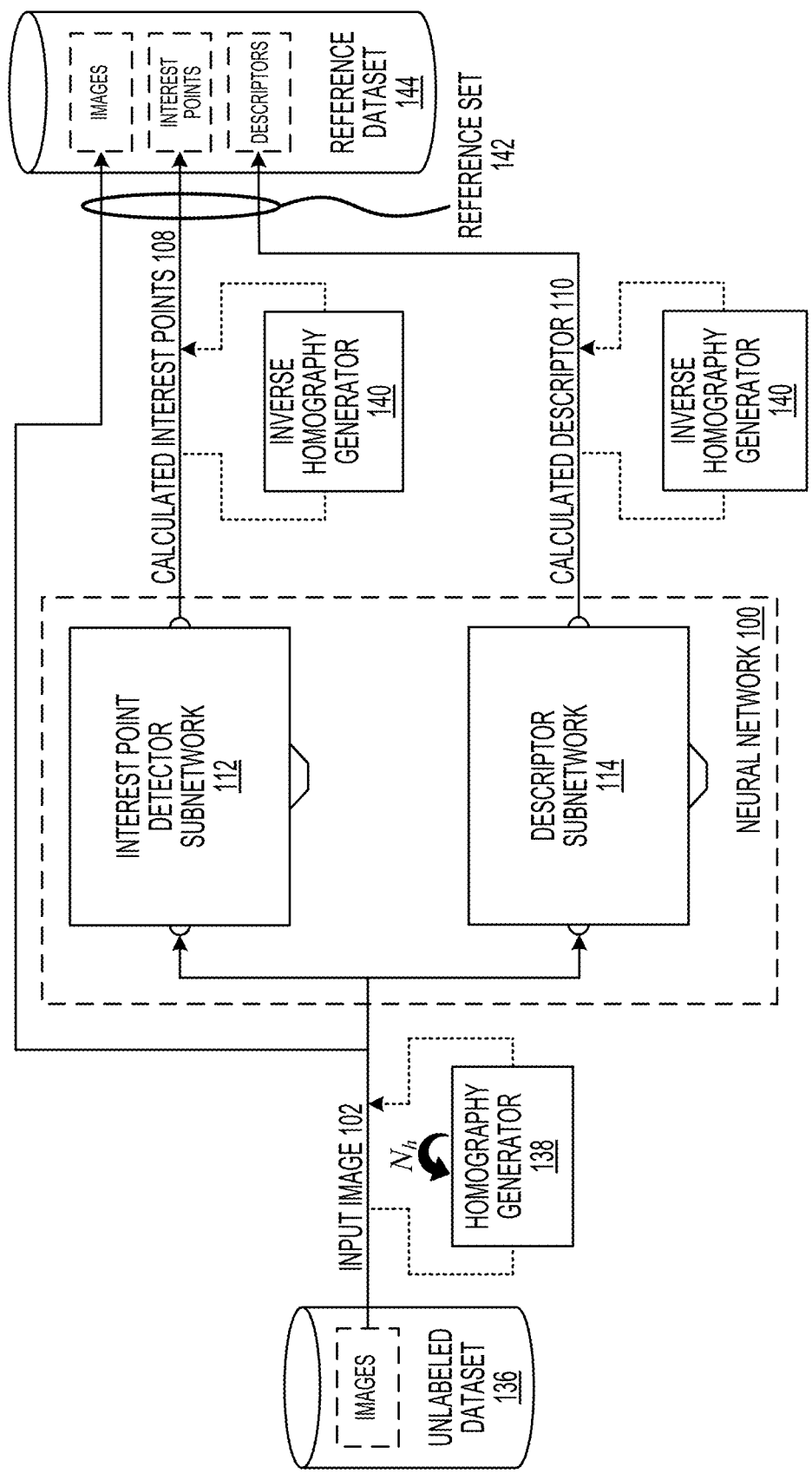
FIG. 4 illustrates a second training step according to the present invention in which a reference dataset is compiled using homographic adaptation.

FIG. 4 illustrates a second training step according to the present invention in which a reference dataset 144 is compiled using homographic adaptation. Reference dataset 144 represents a pseudo-ground truth dataset that includes images taken from an unlabeled dataset 136 comprising, for example, real world images, as well as reference interest points and reference descriptors. Input image 102 is taken from unlabeled dataset 136 and is provided to neural network 100, which calculates a set of calculated interest points 108 and a calculated descriptor 110 based on input image 102. Data may be stored in reference dataset 144 as a reference set 142, each reference set 142 including input image 102, the calculated interest point 108 corresponding to input image 102, and the calculated descriptor 110 corresponding to input image 102.

During a single training iteration, homographic adaptation may be employed to use the average response across a large number of homographic warps of input image 102. A homography generator 138 may be used to apply a plurality of random or pseudo-random homographies to input image 102 prior to passing the image through neural network 100. On the other side of neural network 100, an inverse homography generator 140 may be used to apply a plurality of inverse homographies to calculated interest points 108, the plurality of inverse homographies being the inverse of the plurality of homographies so as to unwarp calculated interest points 108. The process may repeated, for the same input image 102, to obtain a plurality of unwarped calculated interest points. The plurality of unwarped calculated interest points may be aggregated/combined to obtain the set of reference interest points that is stored in reference dataset 144 along with input image 102 and the reference descriptor as part of reference set 142.

Additionally or alternatively, homographic adaptation may be employed to improve the descriptors outputted by neural network 100. For example, during a single training iteration, homography generator 138 may be used to apply a plurality of random or pseudo-random homographies to input image 102 prior to passing the image through neural network 100. On the other side of neural network 100, an inverse homography generator 140 may be used to apply a plurality of inverse homographies to calculated descriptor 110, the plurality of inverse homographies being the inverse of the plurality of homographies so as to unwarp calculated descriptor 110. The process may repeated, for the same input image 102, to obtain a plurality of unwarped calculated descriptors. The plurality of unwarped calculated descriptors may be aggregated/combined to obtain the reference descriptor that is stored in reference dataset 144 along with input image 102 and the set of reference interest points as part of reference set 142.

The number of homographic warps $N_h$ is a hyper-parameter of this approach. In some embodiments, the first homography is set be equal to identity, so that $N_h=1$ (meaning no adaptation). In testing, the range of $N_h$ was varied to try and determine a preferred value, with $N_h$ in some embodiments running from small ($N_h$=10), to medium ($N_h$=100), and large ($N_h$=1000). Results suggest there are diminishing returns when performing more than 100 homographies. On a held-out set of images from MS-COCO, a repeatability score of 0.67 without any homographic adaptation was met, a repeatability boost of 21% when performing $N_h$=100 transforms, and a repeatability boost of 22% when $N_h$=1000 sufficiently demonstrated minimal benefit of using more than 100 homographies.

When combining interest point response maps or descriptor maps, it may be beneficial to differentiate between within-scale aggregation and across-scale aggregation. Real-world images typically contain features at different scales, as some points which would be deemed interesting in a high resolution images, are often not even visible in coarser, lower resolution images. However, within a single-scale, transformations of the image such as rotations and translations should not make interest points appear/disappear. This underlying multi-scale nature of images has different implications for within-scale and across-scale aggregation strategies. Within scale aggregation should be similar to computing the intersection of a set and across-scale aggregation should be similar to the union of a set. The average response across scale can also be used as a multi-scale measure of interest point confidence. The average response across scales are maximized when the interest point is visible across all scales, and these are likely to be the most robust interest points for tracking applications.

When aggregating across scales, the number of scales considered $N_s$ is a hyper-parameter of the approach. The setting of $N_s$=1 corresponds to no multi-scale aggregation (or simply aggregating across the large possible image size only). In some embodiments, for $N_s$>1, the multi-scale set of images being processed are referred to as "the multi-scale image pyramid." Weighting schemes that weigh levels of the pyramid differently may give higher-resolution images a larger weight. This may be important because interest points detected at lower resolutions have poor localization ability, and final aggregated points should be localized as well. Experimental results demonstrated that within-scale aggregation has the biggest effect on repeatability. In some embodiments, the homographic adaptation technique is applied at training time to improve the generalization ability of subnetworks 112, 114 and network 100 on real images.

Theoretical support for the homographic adaptation approach is described in the following paragraphs. In some embodiments, an initial interest point function is represented by $f_\theta(\cdot)$, I the input image, x the resultant points, and H a random homography, such that:

$$x = f_\theta(I)$$

An ideal interest point operator should be covariant with respect to homographies. A function $f_\theta(\cdot)$ is covariant with H if the output transforms with the input. In other words, a covariant detector will satisfy, for all $$Hx = f_\theta(H(I))$$

For clarity, the notation Hx denotes the homography matrix H being applied to the resulting interest points, and H(I) denotes the entire image I being warped by homography matrix H. Moving the homography related terms to the right produces:

$$x = H^{-1} f_\theta(H(I))$$

In practice, an interest point detector will not be perfectly covariant, and different homographies in the previous equation will result in different interest points x. In some embodiments, this is addressed by performing an empirical sum over a sufficiently large sample of random H's. The resulting aggregation over samples yields a superior interest point detector $F(\cdot)$, defined as follows:

$$\hat{F}(I; f_\theta) = \frac{1}{N_h} \sum_{i=1}^{N_h} H_i^{-1} f_\theta(H_i(I))$$

In some embodiments, not all matrices produce good results, not for lack of technical capability, but as not all possible random homographies represent plausible camera transformations. In some embodiments, potential homographies are decomposed into more simple, less expressive transformation classes by sampling within pre-determined ranges for translation, scale, in-plane rotation, and symmetric perspective distortion using a truncated normal distribution. These transformations are composed together with an initial root center crop to help avoid bordering artifacts.

Figure 5:
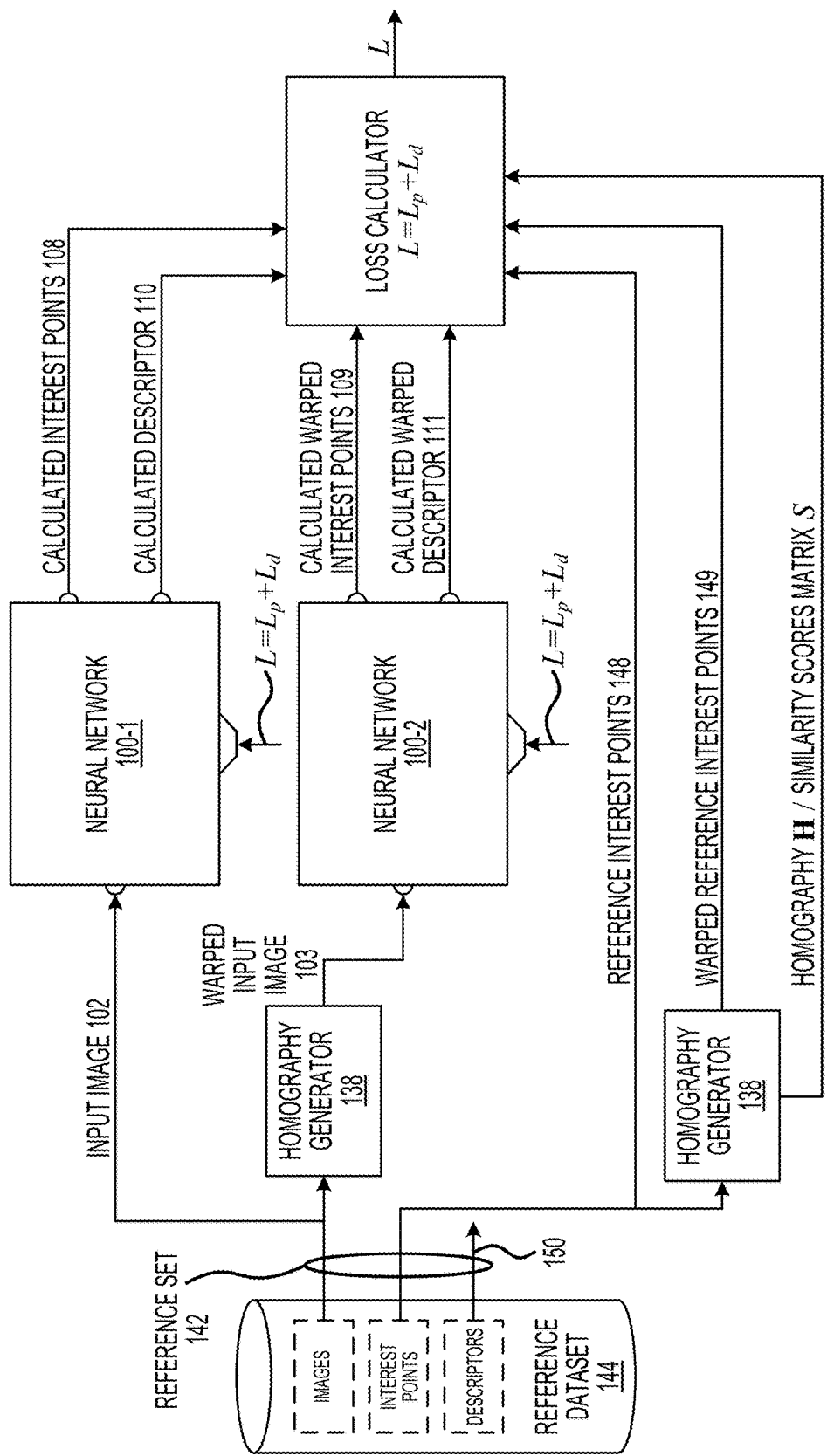
FIG. 5 illustrates a third training step according to the present invention in which a neural network is trained using a reference dataset.

FIG. 5 illustrates a third training step according to the present invention in which neural network 100 is trained using reference dataset 144. During a single training iteration, a single reference set 142 contained in reference dataset 144 is retrieved. Each reference set 142 may include an input image 102, a set of reference interest points 148 corresponding to input image 102, and (optionally) a reference descriptor 150 corresponding to input image 102. Using one or more homography generators 138, a warped input image 103 is generated by applying a homography to input image 102, and a warped set of reference interest points 149 is generated by applying the same homography to reference interest points 148. Sequentially or concurrently, neural network 100-1 receives input image 102 and calculates a set of calculated interest points 108 and a calculated descriptor 110 based on input image 102, and neural network 100-2 receives warped input image 103 and calculates a set of calculated warped interest points 109 and a calculated warped descriptor 111 based on warped input image 103.

A loss L may be calculated based on calculated interest points 108, calculated descriptor 110, calculated warped interest points 109, calculated warped descriptor 111, reference interest points 148, warped reference interest points 149, and/or the homography H, as described below. Neural network 100 may then be modified based on loss L. Modifying neural network 100 based on loss L may include modifying only interest point detector subnetwork 112, modifying only descriptor subnetwork 114, and/or modifying both of subnetworks 112, 114. In some embodiments, neural network 100 is modified such that loss L is reduced for a subsequent run using the same reference set 142. Multiple training iterations are performed until one or more conditions are met, such as loss L dropping below a predetermined threshold and/or reference dataset 144 being exhaustively used.

In some embodiments, loss L is the sum of two intermediate losses: one for the interest point detector, $L_p$, and one for the descriptor, $L_d$. Simultaneous loss optimization is enabled due to the availability of pairs of synthetically warped images which have both (a) pseudo-ground truth interest point locations and (b) the ground truth correspondence from a randomly generated homography H which relates the two images. Loss L is balanced as a function on $\lambda$ by $$L(X, X', D, D', Y, Y', S) = L_p(X, Y) + L_p(X', Y') + \lambda L_d(D, D', S)$$

where X is (or is related to) calculated interest points 108, X' is (or is related to) calculated warped interest points 109, Y is (or is related to) reference interest points 148, Y' is (or is related to) warped reference interest points 149, D is (or is related to) calculated descriptor 110, and D' is (or is related to) calculated warped descriptor 111. S is the similarity scores matrix and may be determined based entirely on the randomly generated homography H. As illustrated in FIG. 5, either homography H or similarity scores matrix S may be fed into the loss calculator.

The interest point detector loss function $L_p$ is a fully convolutional cross entropy loss over the cells $x_{hw} \in X$. The corresponding ground-truth interest point labels Y and individual entries are $y_{hw}$. • The loss is thus:

$$L_p(X, Y) = \frac{1}{H_c W_c} \sum_{h=1, w=1}^{H_c W_c} l_p(x_{hw}; y_{hw})$$

where $$l_p(x_{hw}; y_{hw}) = -\log\left(\frac{\exp(x_{hwy})}{\sum_{k=1}^{65} \exp(x_{hwk})}\right)$$

The descriptor loss is applied to all pairs of descriptor cells $d_{hw} \in D$ from input image 102 and $d'_{h'w'} \in D'$ from warped input image 103. The homography-induced correspondence between the (h, w) cell and the (h', w') cell can be written as follows:

$$s_{hwh'w'} = \begin{cases} 1 & \text{if } \|\widehat{Hp_{hw}} - p_{h'w'}\| \le 8 \\ 0 & \text{otherwise} \end{cases}$$

Where $p_{hw}$ denotes the location of the center pixel in the (h, w) cell, and $\widehat{Hp_{hw}}$ denotes multiplying the cell location $p_{hw}$ by the homography H. The entire set of correspondence for a pair of images is S.

In some embodiments, a weighting term $\lambda_d$ helps balance the presence of more positive correspondences than negative ones. The descriptor loss is given by:

$$L_d(D, D', S) = \frac{1}{(H_c W_c)^2} \sum_{h=1, w=1}^{H_c W_c} \sum_{h'=1, w'=1}^{H_c W_c} l_d(d_{hw}, d'_{h'w'}; s_{hwh'w'})$$

where $$l_d(d, d'; s) = \lambda_d * s * \max(0, m_p - d^T d') + (1-s) * \max(0, d^T d' - m_n)$$

Figure 6:
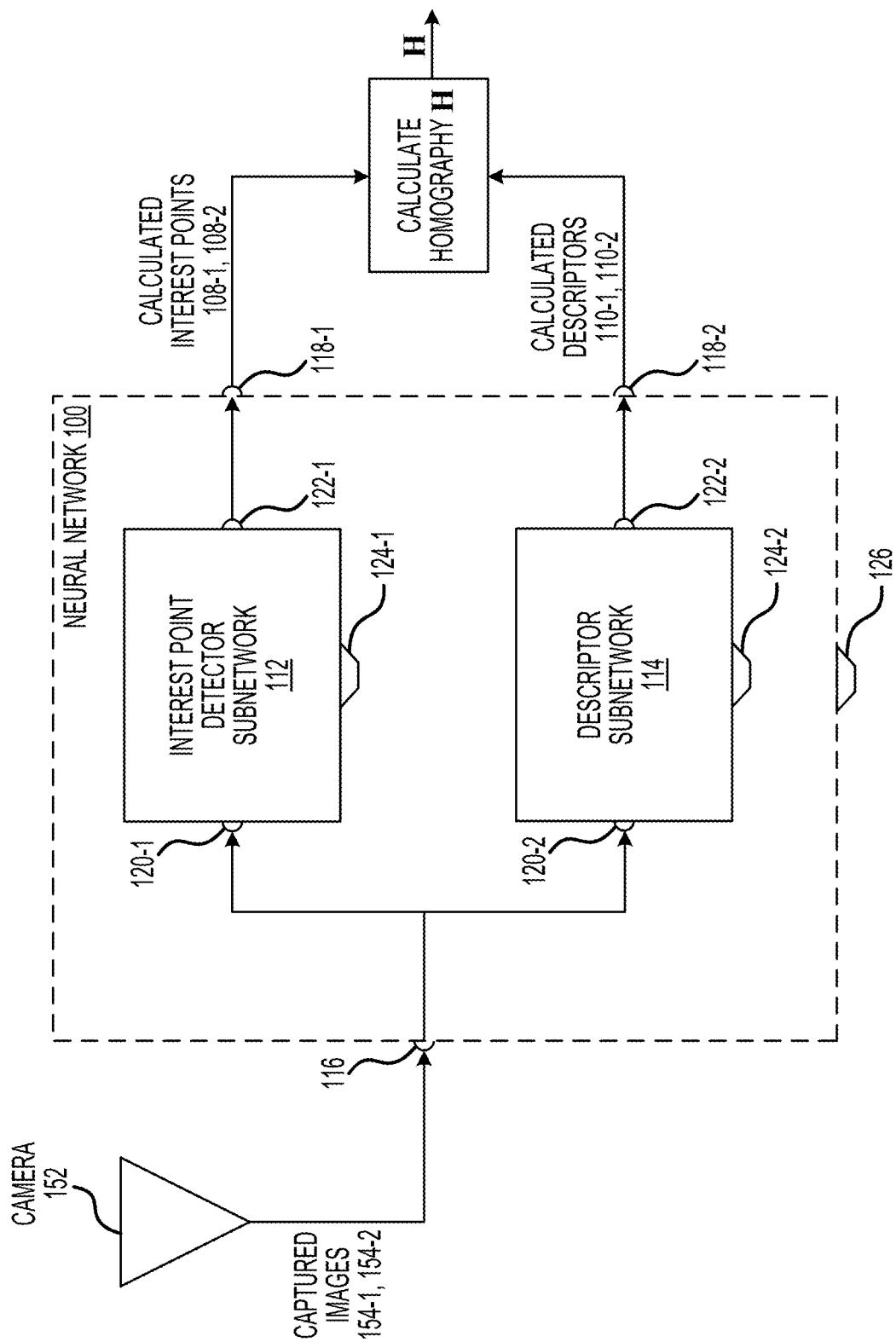
FIG. 6 illustrates a calculation of a homography between two captured images using a neural network, according to some embodiments of the present invention.

FIG. 6 illustrates the calculation of a homography H between two captured images 154-1, 154-2 using neural network 100, according to some embodiments of the present invention. The illustrated embodiment may correspond to a number of systems or devices utilizing neural network 100, such as an optical device, e.g., an AR or mixed reality (MR) device, a self-driving car, an unmanned aerial vehicle, a manned vehicle, a robot, among other possibilities.

After training using the techniques described herein, neural network 100 may operate in a runtime mode in which captured images 154-1, 154-2 are received from a single camera 152 or from multiple cameras. For example, captured image 154-1 may be received from a first camera and captured image 154-2 may be received from a second camera. Captured images 154-1, 154-2 may be captured by different cameras simultaneously or at different times by different cameras or by a single camera. Neural network 100 may receive captured images 154-1, 154-2 via network input 116 and may calculate a set of calculated interest points 108-1 and a calculated descriptor 110-1 based on captured image 154-1, and a set of calculated interest points 108-2 and a calculated descriptor 110-2 based on captured image 154-2.

In some embodiments, prior to determining homography H, point correspondences 106 are determined by a comparison between calculated interest points 108-1 and 108-2, which is informed by the descriptors associated with each of the interest points. For example, descriptors associated with different interest points may be matched. The interest points corresponding to different images having the most similar descriptors may be determined to correspond to each other, according to one of several possible similarity scoring procedures. Homography H may be calculated from point correspondences 106. For example, a relative pose between captured images 154-1, 154-2 may be calculated based on point correspondences 106, and homography H may by calculated as the matrix that represents the camera rotation and translation of the relative pose. Additionally or alternatively, the relative pose may be equal to homography H.

Figure 7:
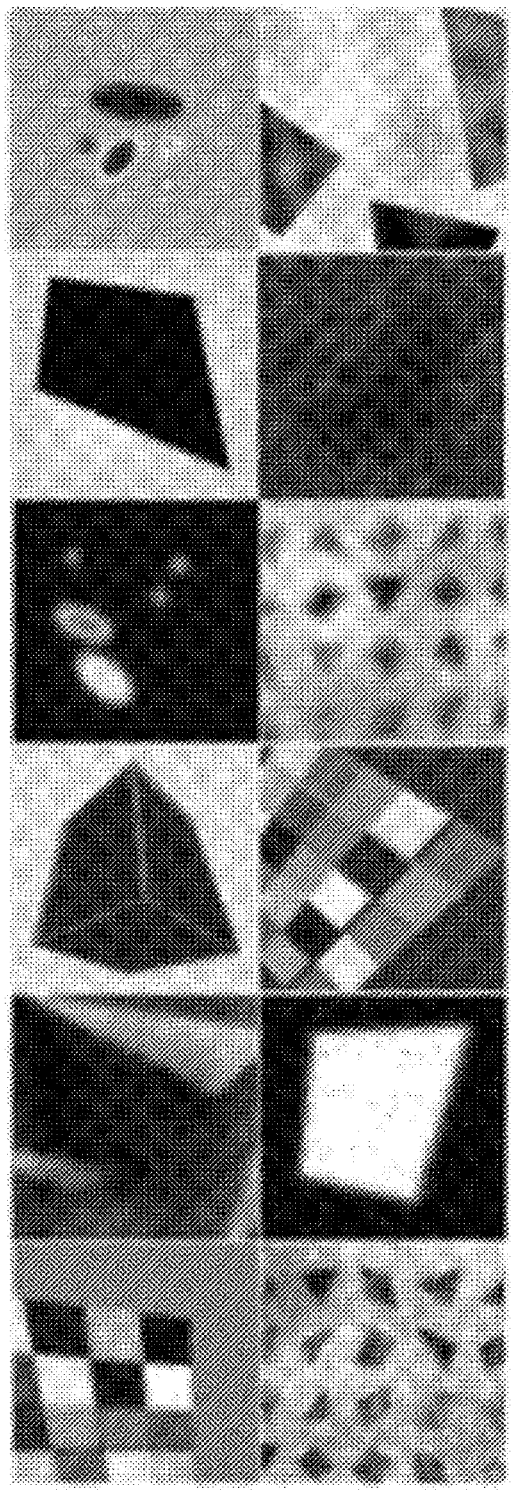
FIG. 7 illustrates an example of a synthetic dataset, according to some embodiments of the present invention.

FIG. 7 illustrates an example of synthetic dataset 128, according to some embodiments of the present invention. In some embodiments, synthetic dataset 128 may contain a plurality of shapes that are representative of a wide number of shape types that have relatively well-defined interest points, such as circles, triangles, quadrilaterals (e.g., squares, rectangles, rhombuses, parallelograms, etc.), pentagons, hexagons, stars, cubes, spheres, ellipsoids, cylinders, cones, prisms, pyramids, lines, etc.

Figure 8:
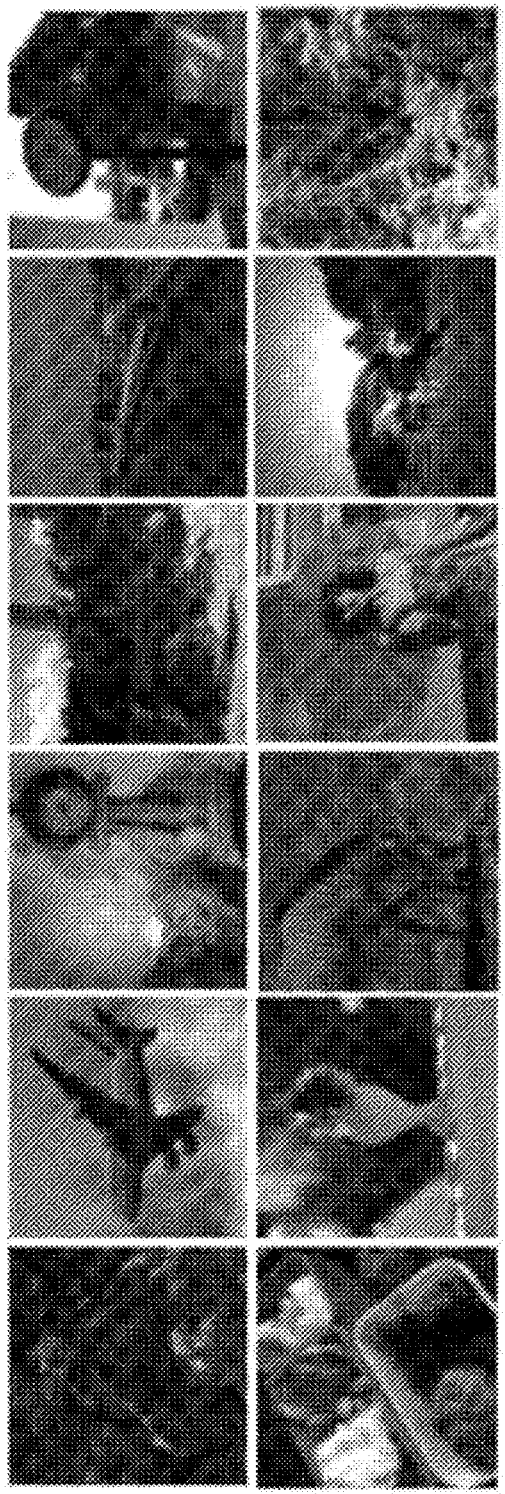
FIG. 8 illustrates an example of an unlabeled dataset, according to some embodiments of the present invention.

FIG. 8 illustrates an example of unlabeled dataset 136, according to some embodiments of the present invention. Unlabeled dataset 136 may contain images of the real world having varying lighting, noise, camera effects, etc. Real images are much more cluttered and noisy than synthetic images and contain diverse visual effects that cannot easily be modeled in a synthetic world.

Figure 9:
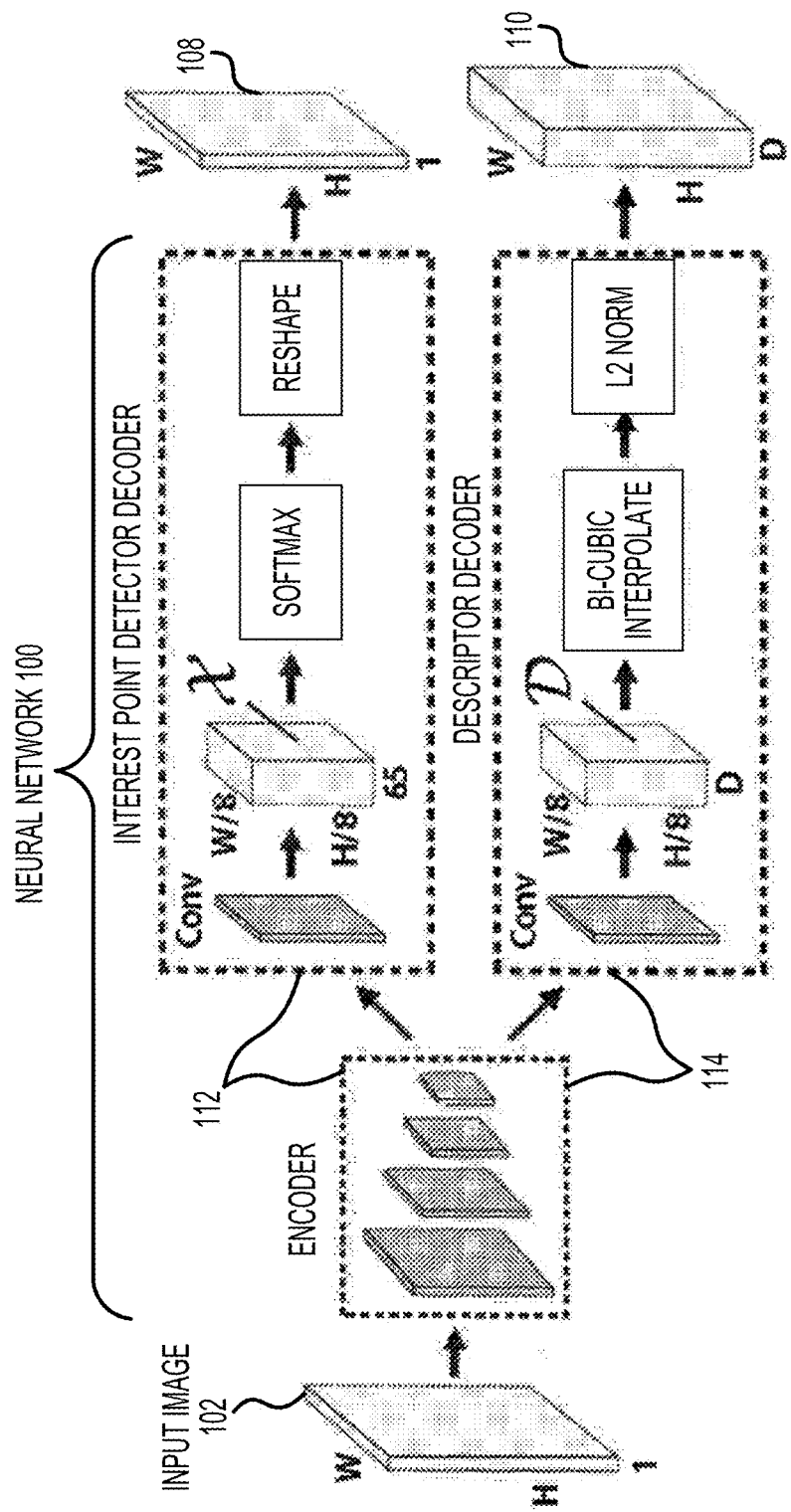
FIG. 9 illustrates an example architecture of a neural network, according to some embodiments of the present invention.

FIG. 9 illustrates an example architecture of neural network 100, according to some embodiments of the present invention. In the illustrated embodiment, neural network 100 includes a single shared encoder that processes and reduces the input image dimensionality. Once processed by the encoder, in some embodiments, the architecture splits into two decoder "heads," which learn task specific weights, one for interest point detection and the other for interest point description.

In some embodiments, neural network 100 uses a VGG-style encoder to reduce the dimensionality of the image. The encoder consists of convolutional layers, spatial downsampling via pooling operations and non-linear activation functions. In some embodiments, the encoder is three max-pooling layers, defining $H_c = H/8$ and $W_c = W/8$ for image I of dimensions H×W. Pixels in lower dimensional outputs are referred to as cells, where three 2×2 non overlapping max pooling operations in the encoder result in 8×8 pixel cells. The encoder maps the input image $I \in R^{Hc \times Wc \times F}$ with smaller spatial dimension and greater channel depth (i.e., $H_c < H$, $W_c < W$, and $F > 1$).

In some instances, network design for dense prediction may involve an encoder-decoder pair, where the spatial resolution is decreased via pooling or strided convolution, and then upsampled back to full resolution via upconvolution operations. Unfortunately, upsampling layers tend to add a high amount of compute and can introduce unwanted checkerboard artifacts, thus for some of the embodiments disclosed herein the interest point detection head utilizes an explicit decoder to reduce the computation of the model. In some embodiments, the interest point detector head computes a value, $X \in R^{Hc \times Wc \times 65}$ and outputs a tensor sized $X \in R^{H \times W}$. The 65 channels correspond to local, nonoverlapping 8×8 grid regions of pixels plus an extra "no interest point" dustbin. After a channel-wise softmax function, the dustbin dimension is removed and a $R^{Hc \times Wc \times 64}$ to $R^{H \times W}$ reshape function is performed.

The descriptor head computes $D \in R^{Hc \times Wc \times D}$ and outputs a tensor sized $R^{H \times W \times D}$. To output a dense map of L2-normalized fixed length descriptors, a model similar to UCN may be used to first output a semi-dense grid of descriptors (for example, one every 8 pixels). Learning descriptors semi-densely rather than densely reduces training memory and keeps the run-time tractable. The decoder then performs bicubic interpolation of the descriptor and then L2-normalizes the activations to be unit length. As depicted in FIG. 9, both decoders operate on a shared and spatially reduced representation of the input. To keep the model fast and easy to train, in some embodiments, both decoders use non-learned upsampling to bring the representation back to $R^{H \times W}$.

In some embodiments, the encoder is a VGG-like architecture with eight 3×3 convolution layers sized 64-64-64-64-128-128-128-128. Every two layers there is a 2×2 max pool layer. Each decoder head has a single 3×3 convolutional layer of 256 units followed by a 1×1 convolution layer with 65 units and 256 units for the interest point detector and descriptor respectively. All convolution layers in the network may be followed by ReLU non-linear activation and BatchNorm normalization.

Figure 10:
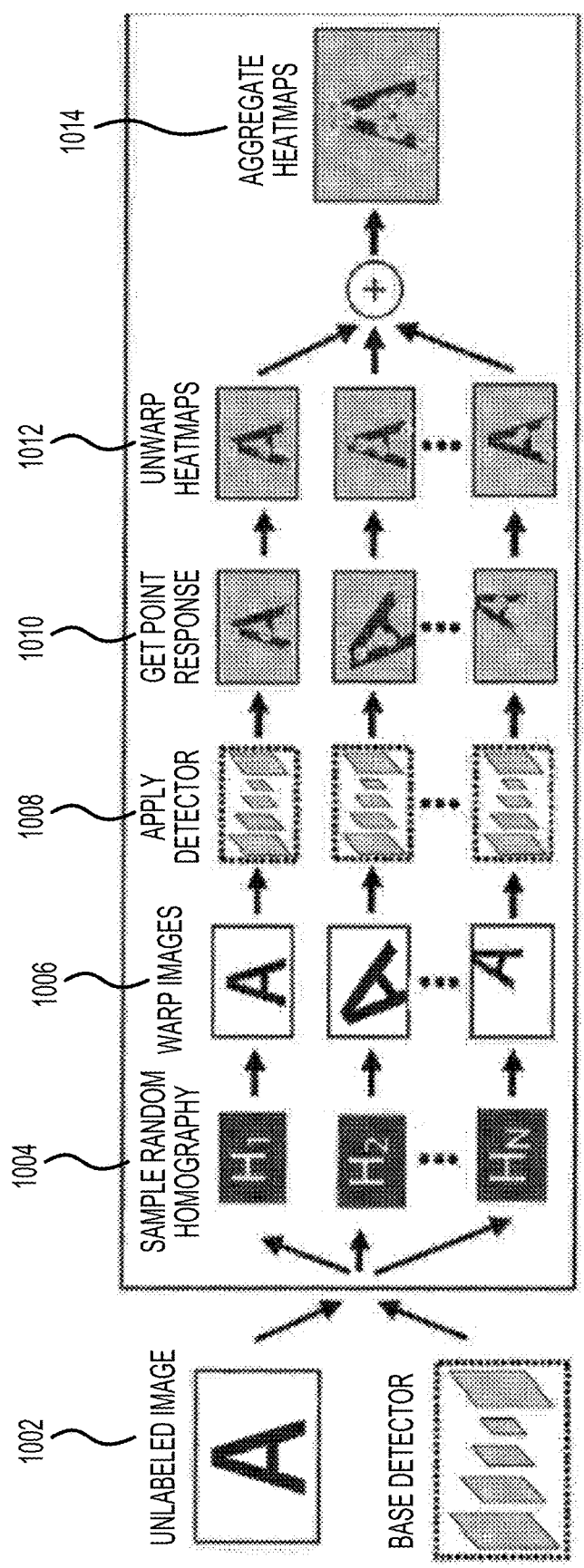
FIG. 10 illustrates various steps of the homographic adaptation that is employed during the second training step, according to some embodiments of the present invention.

FIG. 10 illustrates various steps of the homographic adaptation that is employed during the second training step (described in reference to FIG. 4), according to some embodiments of the present invention. At step 1002, an unlabeled image (e.g., input image 102) is taken from unlabeled dataset 136. At step 1004, a number of random homographies are sampled at homography generator 138. At step 1006, the random homographies are applied to the unlabeled image, generating a number of warped images. At step 1008, the warped images are passed through interest point detector subnetwork 112. At step 1010, a number of point responses (e.g., sets of calculated interest points 108) are calculated by interest point detector subnetwork 112. At step 1012, the point responses (i.e., heatmaps) are unwarped by applying a number of inverse homographies (generated by inverse homography generator 140) to the point responses, generating a number of unwarped heatmaps. At step 1014, the unwarped heatmaps are aggregated by, for example, averaging, summing, or combining through one of various available techniques.

Figure 11:
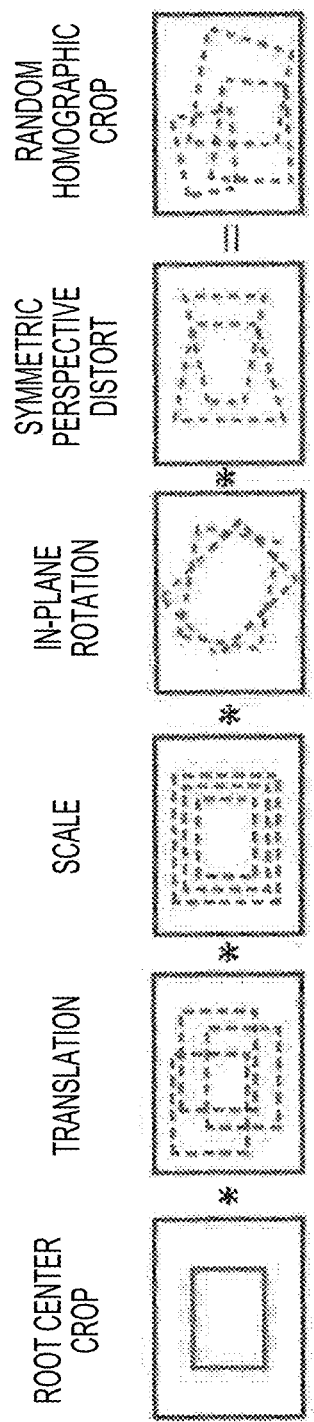
FIG. 11 illustrates certain aspects of random homography generation, according to some embodiments of the present invention.

FIG. 11 illustrates certain aspects of random homography generation, according to some embodiments of the present invention. To generate random realistic homographic transformations, a homography can be decomposed into more simple transformations, such as translations, scaling, rotations, and symmetric perspective distortion. To help avoid bordering artifacts, which happens when the sample region contains pixels outside of the original image, the random homography begins with a center crop, as illustrated in FIG. 11. The transformation magnitudes of the simple transformations are random Gaussian and uniform distributions. To generate the final homographic transformation, the randomly sampled simple transformations are applied consecutively to obtain the final homography.

Figure 12:
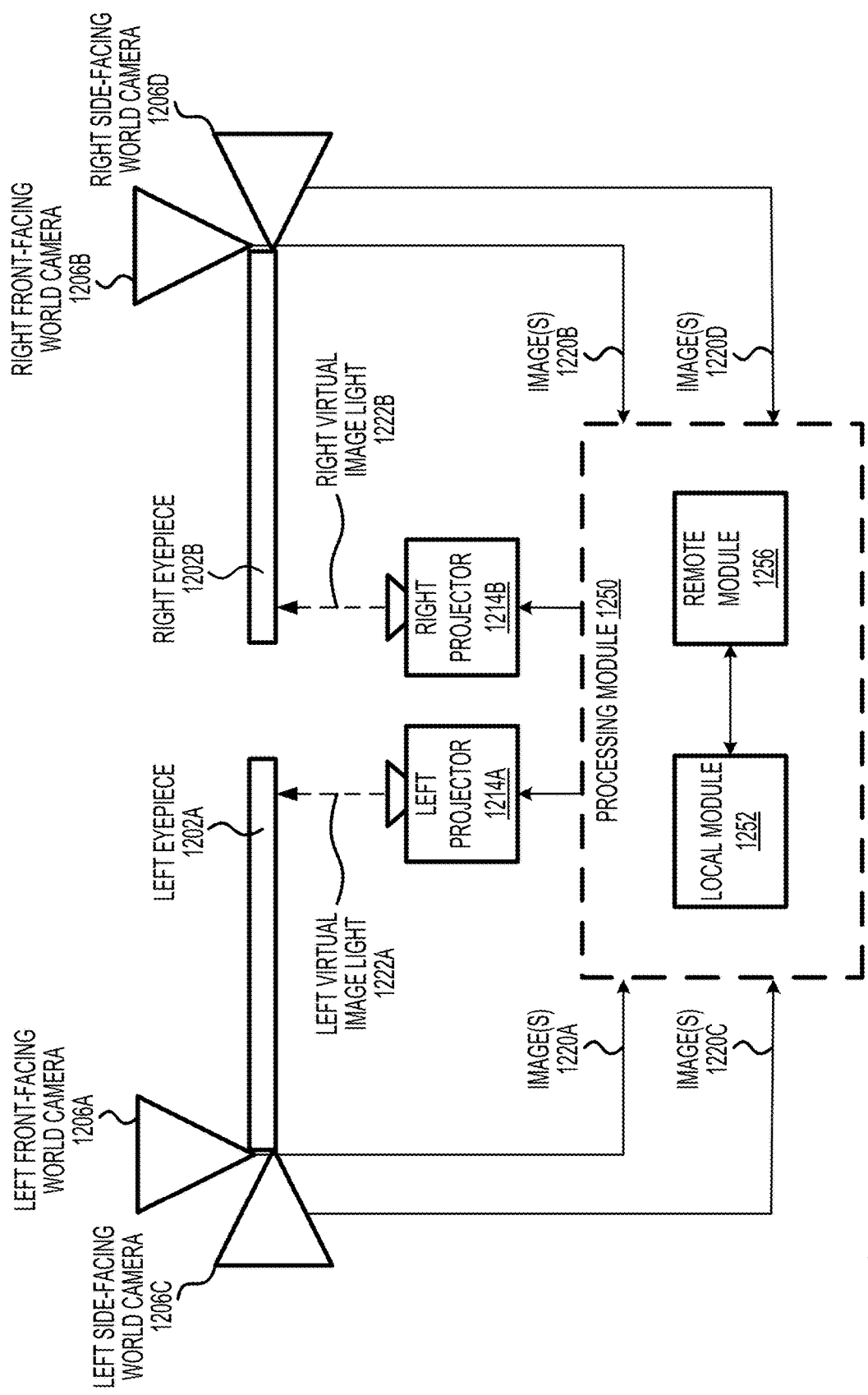
FIG. 12 illustrates a schematic view of an AR device that may utilize embodiments described herein.

FIG. 12 illustrates a schematic view of an AR device 1200 that may utilize embodiments described herein. AR device 1200 may include a left eyepiece 1202A and a right eyepiece 1202B. In some embodiments, AR device 1200 includes one or more sensors including, but not limited to: a left front-facing world camera 1206A attached directly to or near left eyepiece 1202A, a right front-facing world camera 1206B attached directly to or near right eyepiece 1202B, a left side-facing world camera 1206C attached directly to or near left eyepiece 1202A, a right side-facing world camera 1206D attached directly to or near right eyepiece 1202B, a left eye tracker positioned so as to observe a left eye of a user, a right eye tracker positioned so as to observe a right eye of a user, and an ambient light sensor, among other possibilities. In some embodiments, AR device 1200 includes one or more image projection devices such as a left projector 1214A optically linked to left eyepiece 1202A and a right projector 1214B optically linked to right eyepiece 1202B.

Some or all of the components of AR device 1200 may be head mounted such that projected images may be viewed by a user. In one particular implementation, all of the components of AR device 1200 shown in FIG. 12 are mounted onto a single device (e.g., a single headset) wearable by a user. In another implementation, one or more components of a processing module 1250 are physically separate from and communicatively coupled to the other components of AR device 1200 by one or more wired and/or wireless connections. For example, processing module 1250 may include a local module 1252 on the head mounted portion of AR device 1200 and a remote module 1256 physically separate from and communicatively linked to local module 1252. Remote module 1256 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 1250 may include a processor and an associated digital memory, such as non-volatile memory (e.g., flash memory), both of which may be utilized to assist in the processing, caching, and storage of data. The data may include data captured from sensors (which may be, e.g., operatively coupled to AR device 1200) or otherwise attached to a user, such as cameras 1206, the ambient light sensor, eye trackers, microphones, inertial measurement units, accelerometers, compasses, GPS units, radio devices, and/or gyros. For example, processing module 1250 may receive image(s) 1220 from cameras 1206. Specifically, processing module 1250 may receive left front image(s) 1220A from left front-facing world camera 1206A, right front image(s) 1220B from right front-facing world camera 1206B, left side image(s) 1220C from left side-facing world camera 1206C, and right side image(s) 1220D from right side-facing world camera 1206D. In some embodiments, image(s) 1220 may include a single image, a pair of images, a video comprising a stream of images, a video comprising a stream of paired images, and the like. Image(s) 1220 may be periodically generated and sent to processing module 1250 while AR device 1200 is powered on, or may be generated in response to an instruction sent by processing module 1250 to one or more of the cameras. As another example, processing module 1250 may receive ambient light information from the ambient light sensor. As another example, processing module 1250 may receive gaze information from the eye trackers. As another example, processing module 1250 may receive image information (e.g., image brightness values) from one or both of projectors 1214.

Eyepieces 1202A, 1202B may comprise transparent or semi-transparent waveguides configured to direct and outcouple light from projectors 1214A, 1214B, respectively. Specifically, processing module 1250 may cause left projector 1214A to output left virtual image light 1222A onto left eyepiece 1202A, and may cause right projector 1214B to output right virtual image light 1222B onto right eyepiece 1202B. In some embodiments, each of eyepieces 1202 may comprise a plurality of waveguides corresponding to different colors and/or different depth planes. Cameras 1206A, 1206B may be positioned to capture images that substantially overlap with the field of view of a user's left and right eyes, respectively. Accordingly, placement of cameras 1206 may be near a user's eyes but not so near as to obscure the user's field of view. Alternatively or additionally, cameras 1206A, 1206B may be positioned so as to align with the incoupling locations of virtual image light 1222A, 1222B, respectively. Cameras 1206C, 1206D may be positioned to capture images to the side of a user, e.g., in a user's peripheral vision or outside the user's peripheral vision. Image(s) 1220C, 1220D captured using cameras 1206C, 1206D need not necessarily overlap with image(s) 1220A, 1220B captured using cameras 1206A, 1206B.

Figure 13:
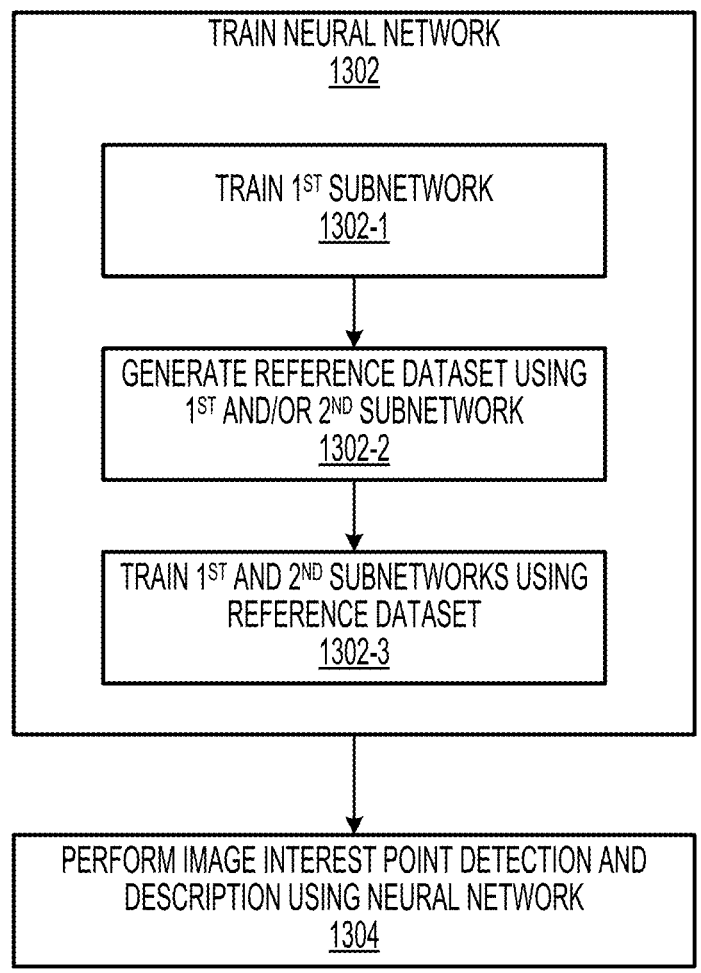
FIG. 13 illustrates a method of training a neural network and performing image interest point detection and description using the neural network, according to some embodiments of the present invention.

FIG. 13 illustrates a method 1300 of training neural network 100 and performing image interest point detection and description using neural network 100, according to some embodiments of the present invention. One or more steps of method 1300 may be performed in an order different than that shown in the illustrated embodiment, and one or more steps of method 1300 may be omitted during performance of method 1300.

At step 1302, neural network 100 is trained. At step 1302-1, interest point detector subnetwork 112 of neural network 100 is trained using synthetic dataset 128. Synthetic dataset 128 may include a plurality of synthetic images and a plurality of sets of synthetic interest points corresponding to the plurality of synthetic images. Step 1302-1 is further described in reference to FIG. 3.

At step 1302-2, reference dataset 144 is generated using interest point detector subnetwork 112 and/or descriptor subnetwork 114. In some embodiments reference dataset 144 is generated using homographic adaptation in which a plurality of warped images are generated by applying a plurality of homographies to input image 102, and a plurality of sets of calculated interest points 108 are calculated by passing the plurality of warped images through interest point detector subnetwork 112. The plurality of sets of calculated interest points 108 are then unwarped and aggregated to obtain the set of reference interest points that is stored in reference dataset 144. Additionally or alternatively, a plurality of calculated descriptors 110 are calculated by passing the plurality of warped images through descriptor subnetwork 114. The plurality of calculated descriptors 110 are then unwarped and aggregated to obtain the reference descriptor that is stored in reference dataset 144. Step 1302-2 is further described in reference to FIG. 4.

At step 1302-3, interest point detector subnetwork 112 and descriptor subnetwork 114 are concurrently trained using reference dataset 144. During a single training iteration, a reference set 142 comprising input image 102, reference interest points 148, and (optionally) reference descriptor 150 is retrieved from reference dataset 144 and is used to calculate loss L. One or both of interest point detector subnetwork 112 and descriptor subnetwork 114 may be modified based on the calculated loss L. Step 1302-3 is further described in reference to FIG. 5.

At step 1304, image interest point detection and description is performed using neural network 100. In some embodiments, a first captured image 154-1 and a second captured image 154-2 are captured using camera 152 or two different cameras. Captured images 154-1, 154-2 may then be passed through neural network 100. Calculated interest points 108-1, 108-2 and calculated descriptors 110-1, 110-2 may be used to calculate homography H. In some embodiments, AR device 1200 may adjust one or both of virtual image light 1222A, 1222B based on homography H. For example, when a user of AR device 1200 turns his/her head while viewing virtual content perceived by the user viewing virtual image light 1222A, 1222B projected onto eyepieces 1202A, 1202B by projectors 1214A, 1214B, the virtual light will need to be adjusted based on the homography H associated with the new viewing angle. Step 1304 is further described in reference to FIG. 6.

Figure 14:
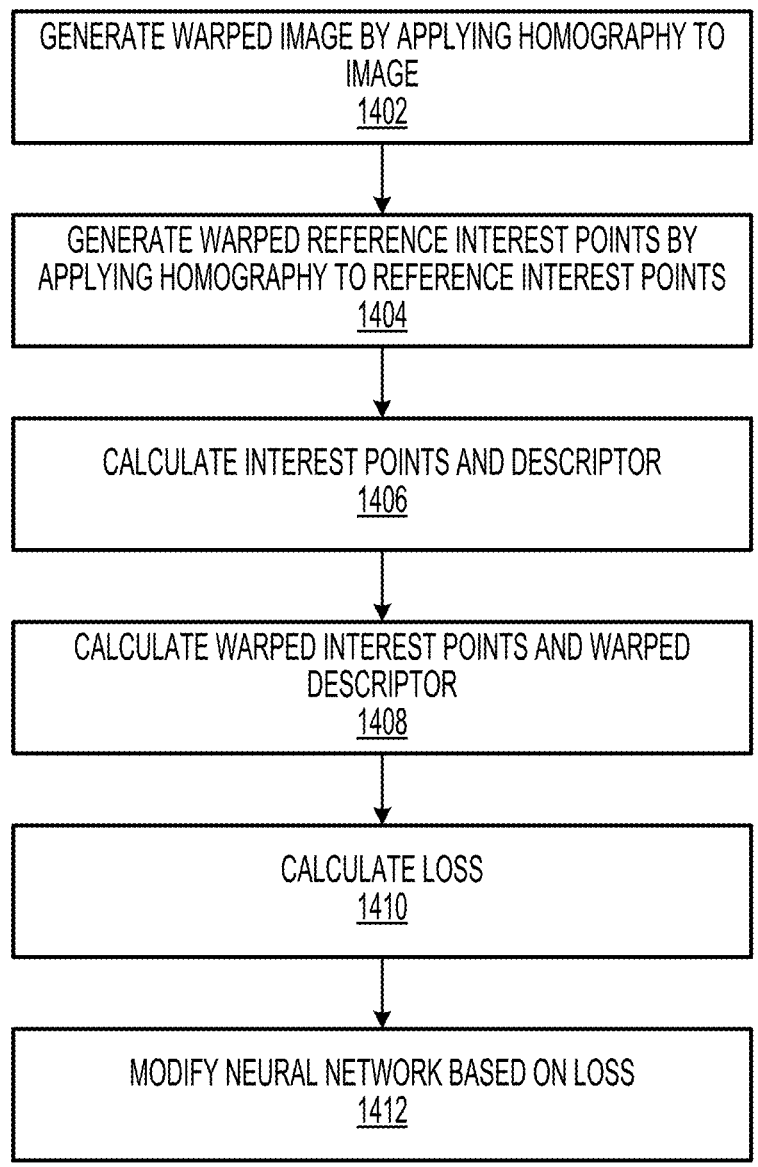
FIG. 14 illustrates a method of training a neural network for image interest point detection and description, according to some embodiments of the present invention.

FIG. 14 illustrates a method 1400 of training neural network 100 for image interest point detection and description, according to some embodiments of the present invention. One or more steps of method 1400 may be performed in an order different than that shown in the illustrated embodiment, and one or more steps of method 1400 may be omitted during performance of method 1400.

At step 1402, warped input image 103 is generated by applying a homography to input image 102. At step 1404, warped reference interest points 149 are generated by applying the homography to reference interest points 148. At step 1406, calculated interest points 108 and calculated descriptor 110 are calculated by neural network 100 receiving input image 102 as input. At step 1408, calculated warped interest points 109 and calculated warped descriptor 111 are calculated by neural network 100 receiving warped input image 103 as input.

At step 1410, loss L is calculated based on one or more of calculated interest points 108, calculated descriptor 110, calculated warped interest points 109, calculated warped descriptor 111, reference interest points 148, warped reference interest points 149, and the homography. In some embodiments, loss L is further calculated based on the homography. At step 1412, neural network 100 is modified based on loss L.

Figure 15:
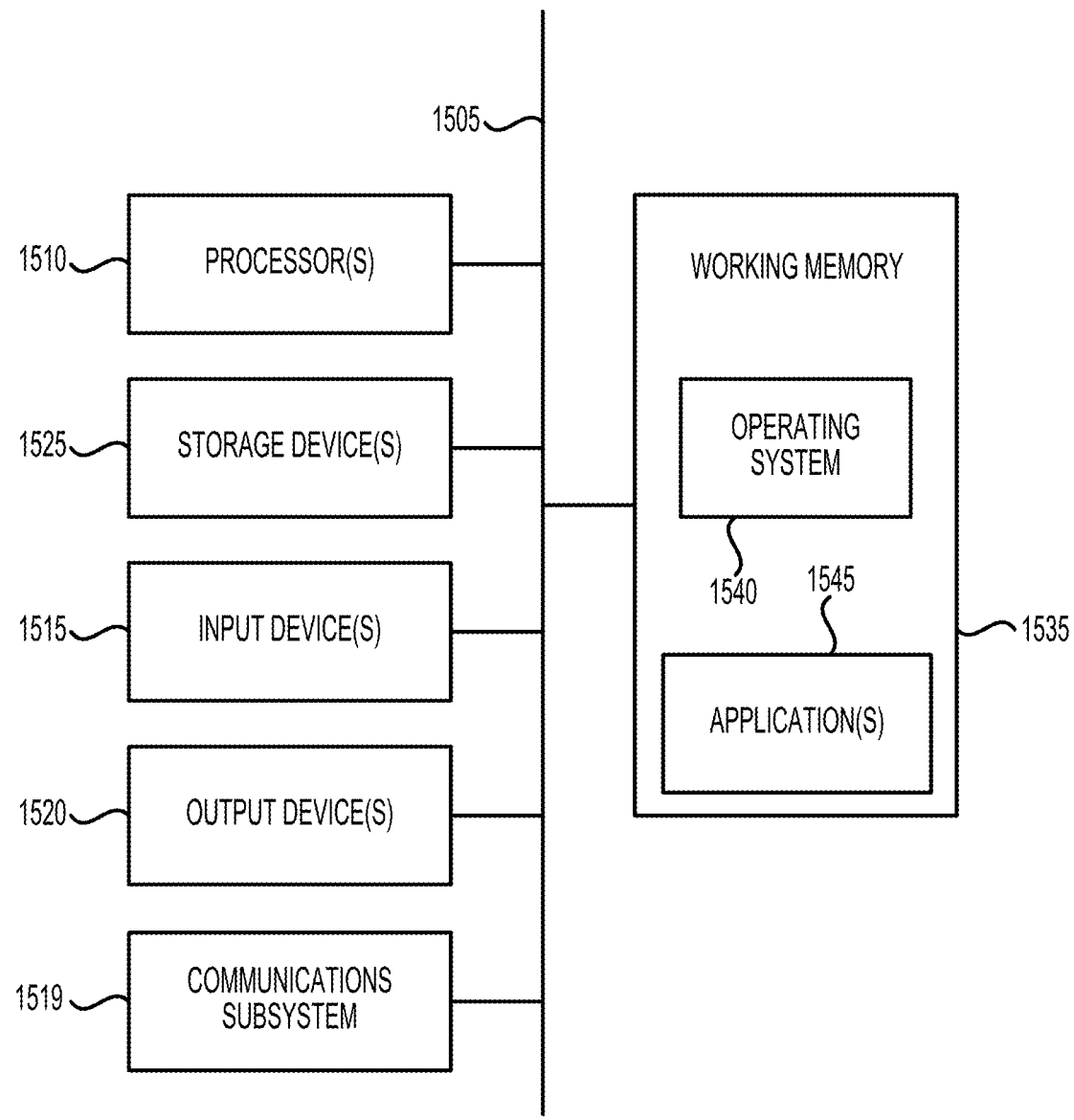
FIG. 15 illustrates a simplified computer system according to some embodiments described herein.

FIG. 15 illustrates a simplified computer system 1500 according to some embodiments described herein. FIG. 15 provides a schematic illustration of one example of computer system 1500 that can perform some or all of the steps of the methods provided by various embodiments. It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner.

Computer system 1500 is shown comprising hardware elements that can be electrically coupled via a bus 1505, or may otherwise be in communication, as appropriate. The hardware elements may include one or more processors 1510, including without limitation one or more general-purpose processors and/or one or more special-purpose processors such as digital signal processing chips, graphics acceleration processors, and/or the like; one or more input devices 1515, which can include without limitation a mouse, a keyboard, a camera, and/or the like; and one or more output devices 1520, which can include without limitation a display device, a printer, and/or the like.

Computer system 1500 may further include and/or be in communication with one or more non-transitory storage devices 1525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1500 might also include a communications subsystem 1519, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1519 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1519. In other embodiments, a portable electronic device, e.g. the first electronic device, may be incorporated into computer system 1500, e.g., an electronic device as an input device 1515. In some embodiments, computer system 1500 will further comprise a working memory 1535, which can include a RAM or ROM device, as described above.

Computer system 1500 also can include software elements, shown as being currently located within the working memory 1535, including an operating system 1540, device drivers, executable libraries, and/or other code, such as one or more application programs 1545, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1525 described above. In some cases, the storage medium might be incorporated within a computer system, such as computer system 1500. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1500 and/or might take the form of source and/or installable code, which, upon compilation and/or installation on computer system 1500 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1500 to perform methods in accordance with various embodiments of the technology. According to a set of embodiments, some or all of the procedures of such methods are performed by computer system 1500 in response to processor 1510 executing one or more sequences of one or more instructions, which might be incorporated into the operating system 1540 and/or other code, such as an application program 1545, contained in the working memory 1535. Such instructions may be read into the working memory 1535 from another computer-readable medium, such as one or more of the storage device(s) 1525. Merely by way of example, execution of the sequences of instructions contained in the working memory 1535 might cause the processor(s) 1510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In embodiments implemented using computer system 1500, various computer-readable media might be involved in providing instructions/code to processor(s) 1510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1525. Volatile media include, without limitation, dynamic memory, such as the working memory 1535.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1500.

The communications subsystem 1519 and/or components thereof generally will receive signals, and the bus 1505 then might carry the signals and/or the data, instructions, etc. carried by the signals to the working memory 1535, from which the processor(s) 1510 retrieves and executes the instructions. The instructions received by the working memory 1535 may optionally be stored on a non-transitory storage device 1525 either before or after execution by the processor(s) 1510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of training a neural network for image interest point detection and description, the method comprising:
   generating a reference dataset comprising a plurality of reference sets, wherein each of the plurality of reference sets includes:
      an image; and
      a set of reference interest points corresponding to the image; and
   for each reference set of the plurality of reference sets:
      generating a warped image and a warped set of reference interest points by applying a generated homography to each of the image and the set of reference interest points;
      calculating, by the neural network receiving the image as input, a set of calculated interest points and a calculated descriptor;
      calculating, by the neural network receiving the warped image as input, a set of calculated warped interest points and a calculated warped descriptor;
      calculating a loss based on the set of calculated interest points, the calculated descriptor, the set of calculated warped interest points, the calculated warped descriptor, the set of reference interest points, the warped set of reference interest points, and the generated homography; and
      modifying the neural network based on the loss.

2. The method of claim 1, wherein the neural network includes an interest point detector subnetwork and a descriptor subnetwork, wherein:
   the interest point detector subnetwork is configured to receive the image as input and calculate the set of calculated interest points based on the image; and
   the descriptor subnetwork is configured to receive the image as input and calculate the calculated descriptor based on the image.

3. The method of claim 2, wherein modifying the neural network based on the loss includes modifying one or both of the interest point detector subnetwork and the descriptor subnetwork based on the loss.

4. The method of claim 2, further comprising:
   prior to generating the reference dataset, training the interest point detector subnetwork using a synthetic dataset including a plurality of synthetic images and a plurality of sets of synthetic interest points, wherein generating the reference dataset includes generating the reference dataset using the interest point detector subnetwork.

5. The method of claim 1, wherein generating the reference dataset includes:
   for each reference set of the plurality of reference sets:
      obtaining the image from an unlabeled dataset comprising a plurality of unlabeled images;
      generating a plurality of warped images by applying a plurality of homographies to the image;

calculating, by the neural network receiving the plurality of warped images as input, a plurality of sets of calculated warped interest points;

generating a plurality of sets of calculated interest points by applying a plurality of inverse homographies to the plurality of sets of calculated warped interest points; and aggregating the plurality of sets of calculated interest points to obtain the set of reference interest points.

6. The method of claim 1, wherein each of the plurality of reference sets further includes a reference descriptor corresponding to the image, and wherein generating the reference dataset includes:

for each reference set of the plurality of reference sets:
obtaining the image from an unlabeled dataset comprising a plurality of unlabeled images;
generating a plurality of warped images by applying a plurality of homographies to the image;
calculating, by the neural network receiving the plurality of warped images as input, a plurality of calculated warped descriptors;
generating a plurality of calculated descriptors by applying a plurality of inverse homographies to the plurality of calculated warped descriptors; and
aggregating the plurality of calculated descriptors to obtain the reference descriptor.

7. The method of claim 1, wherein the set of reference interest points is a two-dimensional map having values corresponding to a probability that a particular pixel of the image has an interest point is located at the particular pixel.

8. A method of performing image interest point detection and description using a neural network, the method comprising:

capturing a first image;
capturing a second image;
calculating, by the neural network receiving the first image as input, a first set of calculated interest points and a first calculated descriptor;
calculating, by the neural network receiving the second image as input, a second set of calculated interest points and a second calculated descriptor; and
determining a homography between the first image and the second image based on the first and second sets of calculated interest points and the first and second calculated descriptors;
wherein the neural network is trained by:
generating a reference dataset comprising a plurality of reference sets, wherein each of the plurality of reference sets includes:
an image; and
a set of reference interest points corresponding to the image; and
for each reference set of the plurality of reference sets:
generating a warped image and a warped set of reference interest points by applying a generated homography to each of the image and the set of reference interest points.

9. The method of claim 8, wherein the neural network is further trained by:
for each reference set of the plurality of reference sets:
calculating, by the neural network receiving the image as input, a set of calculated interest points and a calculated descriptor;
calculating, by the neural network receiving the warped image as input, a set of calculated warped interest points and a calculated warped descriptor;
calculating a loss based on the set of calculated interest points, the calculated descriptor, the set of calculated warped interest points, the calculated warped descriptor, the set of reference interest points, the warped set of reference interest points, and the generated homography; and
modifying the neural network based on the loss.

10. The method of claim 9, wherein generating the reference dataset includes:
for each reference set of the plurality of reference sets:
obtaining the image from an unlabeled dataset comprising a plurality of unlabeled images;
generating a plurality of warped images by applying a plurality of homographies to the image;
calculating, by the neural network receiving the plurality of warped images as input, a plurality of sets of calculated warped interest points;
generating a plurality of sets of calculated interest points by applying a plurality of inverse homographies to the plurality of sets of calculated warped interest points; and
aggregating the plurality of sets of calculated interest points to obtain the set of reference interest points.

11. The method of claim 9, wherein each of the plurality of reference sets further includes a reference descriptor corresponding to the image, and wherein generating the reference dataset includes:
for each reference set of the plurality of reference sets:
obtaining the image from an unlabeled dataset comprising a plurality of unlabeled images;
generating a plurality of warped images by applying a plurality of homographies to the image;
calculating, by the neural network receiving the plurality of warped images as input, a plurality of calculated warped descriptors;
generating a plurality of calculated descriptors by applying a plurality of inverse homographies to the plurality of calculated warped descriptors; and
aggregating the plurality of calculated descriptors to obtain the reference descriptor.

12. An optical device comprising:
at least one camera configured to capture a first image and a second image; and
one or more processors coupled to the camera and configured to perform operations comprising:
receiving the first image and the second image from the at least one camera;
calculating, by a neural network using the first image as an input, a first set of calculated interest points and a first calculated descriptor;
calculating, by the neural network using the second image as an input, a second set of calculated interest points and a second calculated descriptor; and
determining a homography between the first image and the second image based on the first and second sets of calculated interest points and the first and second calculated descriptors;
wherein the neural network is trained by:
generating a reference dataset comprising a plurality of reference sets, wherein each of the plurality of reference sets includes:
an image; and
a set of reference interest points corresponding to the image; and
for each reference set of the plurality of reference sets:
generating a warped image and a warped set of reference interest points by applying a generated homography to each of the image and the set of reference interest points.

13. The optical device of claim 12, wherein the neural network is further trained by:
for each reference set of the plurality of reference sets:
calculating, by the neural network receiving the image as input, a set of calculated interest points and a calculated descriptor;
calculating, by the neural network receiving the warped image as input, a set of calculated warped interest points and a calculated warped descriptor;
calculating a loss based on the set of calculated interest points, the calculated descriptor, the set of calculated warped interest points, the calculated warped descriptor, the set of reference interest points, the warped set of reference interest points, and the generated homography; and
modifying the neural network based on the loss.

14. The optical device of claim 13, wherein each of the plurality of reference sets further includes a reference descriptor corresponding to the image, and wherein generating the reference dataset includes:
for each reference set of the plurality of reference sets:
obtaining the image from an unlabeled dataset comprising a plurality of unlabeled images;
generating a plurality of warped images by applying a plurality of homographies to the image;
calculating, by the neural network receiving the plurality of warped images as input, a plurality of calculated warped descriptors;
generating a plurality of calculated descriptors by applying a plurality of inverse homographies to the plurality of calculated warped descriptors; and
aggregating the plurality of calculated descriptors to obtain the reference descriptor.

* * * * *